United States Patent
Dial et al.

(10) Patent No.: US 12,517,856 B2
(45) Date of Patent: Jan. 6, 2026

(54) MODULAR QUANTUM SYSTEM WITH DISCRETE LEVELS OF CONNECTIVITY

(71) Applicant: International Business Machines Corporation, Armonk, NY (US)

(72) Inventors: Oliver Dial, Yorktown Heights, NY (US); Jay Michael Gambetta, Yorktown Heights, NY (US); Blake Robert Johnson, Ossining, NY (US); Jerry M. Chow, Scarsdale, NY (US); Jason S. Orcutt, Katonah, NY (US); David Abraham, Croton, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 640 days.

(21) Appl. No.: 17/936,247

(22) Filed: Sep. 28, 2022

(65) Prior Publication Data

US 2023/0363296 A1   Nov. 9, 2023

Related U.S. Application Data

(60) Provisional application No. 63/364,401, filed on May 9, 2022.

(51) Int. Cl.
*G06F 13/40* (2006.01)
*G06F 13/36* (2006.01)
(Continued)

(52) U.S. Cl.
CPC .......... *G06F 13/4068* (2013.01); *G06F 13/36* (2013.01); *G06F 13/4027* (2013.01); *G06N 10/40* (2022.01); *H10N 69/00* (2023.02)

(58) Field of Classification Search
CPC .............................. G06N 10/40; H10N 69/00
See application file for complete search history.

(56) References Cited

U.S. PATENT DOCUMENTS 9,438,246 B1 *  9/2016 Naaman ................. G11C 11/44
9,892,365 B2    2/2018 Rigetti et al.
(Continued)

FOREIGN PATENT DOCUMENTS

WO    2022/038205 A1    2/2022

OTHER PUBLICATIONS

International Search Report and Written Opinion received for PCT Application Serial No. PCT/EP2023/062026 dated Jul. 24, 2023, 14 pages.
(Continued)

*Primary Examiner* — Henry Tsai
*Assistant Examiner* — Aurangzeb Hassan
(74) *Attorney, Agent, or Firm* — Amin, Turocy & Watson, LLP

(57) ABSTRACT

Devices and methods that facilitate modular quantum systems with discreet levels of connectivity are provided. In various embodiments, a quantum computing device can comprise one or more modules comprising at least qubits, buses, and readout structures; a plurality of couplers, wherein the plurality of couplers comprises at least two couplers selected from a group consisting of: classical couplers, short-range couplers, and long-range couplers, that are adapted for coupling a plurality of the at least qubits, buses, and readout structures; and a connection from the one or more modules to one or more classical controllers external to a cryogenic environment comprising the one or more modules.

20 Claims, 34 Drawing Sheets

(51) Int. Cl.
  *G06N 10/40* (2022.01)
  *H10N 69/00* (2023.01)

(56) References Cited

U.S. PATENT DOCUMENTS

| | | | | |
|---|---|---|---|---|
| 11,054,590 | B1* | 7/2021 | Wan | G02B 6/423 |
| 11,127,892 | B2* | 9/2021 | Megrant | H10N 60/0912 |
| 11,558,069 | B1* | 1/2023 | Sparrow | G06N 10/40 |
| 2017/0116542 | A1* | 4/2017 | Shim | H10N 60/12 |
| 2017/0214410 | A1* | 7/2017 | Hincks | G06N 10/20 |
| 2018/0322409 | A1* | 11/2018 | Barends | G06F 17/16 |
| 2021/0066570 | A1* | 3/2021 | Luethi | H01B 12/02 |
| 2021/0233617 | A1* | 7/2021 | Niroula | G06F 30/20 |
| 2021/0374307 | A1* | 12/2021 | Haener | G06F 30/20 |
| 2022/0147856 | A1* | 5/2022 | Kliuchnikov | G06F 15/82 |
| 2022/0207402 | A1* | 6/2022 | Lechner | G06N 10/40 |
| 2022/0237495 | A1* | 7/2022 | Yohannes | G06N 10/20 |
| 2022/0278683 | A1* | 9/2022 | Haah | H03K 19/195 |
| 2022/0343201 | A1* | 10/2022 | Lechner | G06N 10/20 |
| 2023/0153125 | A1* | 5/2023 | Subramanian | G06N 10/40 718/102 |
| 2023/0197833 | A1* | 6/2023 | Thomas | H10D 30/6733 327/527 |
| 2024/0078460 | A1* | 3/2024 | Finck | G06N 10/70 |
| 2024/0177042 | A1* | 5/2024 | Dang | H10N 60/805 |
| 2025/0181953 | A1* | 6/2025 | Cross | G06N 10/70 |

OTHER PUBLICATIONS

Chang, H.-S. et al. | "Remote entanglement via adiabatic passage using a tunably-dissipative quantum communication system," arXiv:2005.12334v2 [quant-ph] May 28, 2020, 27 pages.
Hidaka, M. | "Japanese Activities for Superconducting CircuitsUsing Flip-chip Configurations," IEEE CSC & ESAS Superconductivity News Forum (global edition), Sep. 2019. Invited presentation 2-DI-I-1 given at ISEC, Jul. 28-Aug. 1, 2019, Riverside, USA, 3 pages.
Piveteau, Ch. et al. | "Circuit knitting with classical communication," arXiv:2205.00016v1 [quant-ph] Apr. 29, 2022, 19 pages.
Leung, N. et al. | "Deterministic bidirectional communication and remote entanglement generation between superconducting qubits," npj Quantum Information (Feb. 15, 2019) 5:18 ; https://doi.org/10.1038/s41534-019-0128-0, 5 pages.
Zhong, et al. | "Deterministic multi-qubit entanglement in a quantum network," arXiv:2011.13108v1 [quant-ph] Nov. 26, 2020, 38 pages.
Roch, N. et al. | "Observation of measurement-induced entanglement and quantum trajectories of remote superconducting qubits," arXiv:1402.1868v2 [cond-mat.mes-hall] May 2, 2014, 18 pages.
Zhou, Ch. et al. | " A modular quantum computer based on a quantum state router," arXiv:2109.06848v2 [quant-ph] Apr. 11, 2022, 21 pages.
Maezawa, M. et al. | "Toward Practical-Scale Quantum Annealing Machine for Prime Factoring," J. Phys. Soc. Jpn. 88, 061012 (2019), 17 pages.
Zhao, P. et al. | "Tunable coupling of widely separated superconducting qubits: A possible application towards a modular quantum device," arXiv:2201.03184v1 [quant-ph] Jan. 10, 2022, 6 pages.
Gold, A. et al. | "Entanglement Across Separate Silicon Dies in a Modular Superconducting Qubit Device". arXiv:2102.13293v2 [quant-ph] Mar. 11, 2021, 9 pages.
Reilly, D. | "Engineering the quantum-classical interface of solid-state qubits". npj Quantum Information (2015) 1, 15011; doi:10.1038/npjqi.2015.11; published online Oct. 27, 2015, 10 pages.

* cited by examiner

2300

2302 Coupling a plurality of at least qubits, buses, and readout structures using a plurality of couplers, wherein the plurality of couplers comprises at least two couplers selected from a group consisting of: classical couplers, short-range couplers, and long-range couplers, and wherein the plurality of at least qubits, buses and readout structures are comprised by one or more modules

FIG. 23

MODULAR QUANTUM SYSTEM WITH DISCRETE LEVELS OF CONNECTIVITY

BACKGROUND

The subject disclosure relates to quantum computing processors, and more specifically to modular quantum systems with discreet levels of connectivity.

Quantum computing is generally the use of quantum-mechanical phenomena to perform computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1. Quantum computing has the potential to solve problems that, due to computational complexity, cannot be solved or can only be solved slowly on a classical computer.

On a large scale, quantum computing cloud service providers can execute millions of quantum jobs for users during a year. Each quantum job can include the execution of one or more quantum programs at a physical logic circuit. Physical, real-world, quantum logic circuits controlled by a quantum system can include a plurality of qubits.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, devices, systems, computer-implemented methods, apparatus and/or computer program products that can facilitate modular quantum systems with discreet levels of connectivity.

According to an embodiment, a quantum computing device can comprise one or more modules comprising at least qubits, buses, and readout structures; a plurality of couplers, wherein the plurality of couplers comprises at least two couplers selected from a group consisting of: classical couplers, short-range couplers, and long-range couplers, that are adapted for coupling a plurality of the at least qubits, buses, and readout structures; and a connection from the one or more modules to at least two classical controllers external to a cryogenic environment comprising the one or more modules.

According to an embodiment, a method can comprise coupling a plurality of at least qubits, buses, and readout structures using a plurality of couplers, wherein the plurality of couplers comprises at least two couplers selected from a group consisting of: classical couplers, short-range couplers, and long-range couplers, and wherein the plurality of at least qubits, buses and readout structures are comprised by one or more modules.

According to an embodiment, a quantum computing device can comprise one or more modules comprising at least qubits, buses, and readout structures; a plurality of couplers, wherein the plurality of couplers comprises at least two couplers selected from a group consisting of: classical couplers, short-range couplers, and long-range couplers, that are adapted for coupling a plurality of the at least qubits, buses, and readout structures; and a connection from the one or more modules to a classical controller external to a cryogenic environment comprising the one or more modules.

Approaches described herein can relate to a quantum computing device. The quantum computing device can comprise modules which can contain a number of qubits, buses, and readout elements, a plurality of which can be coupled together using a combination of classical couplers, short-range couplers, and long-range couplers that can be adapted to respectively provide classical, near-range, and medium-range connections. It is to be appreciated that the classical couplers, short-range couplers, and long-range couplers are hereafter referred to as p-type couplers, m-type couplers, and l-type couplers, respectively. Thus, the m-type couplers can be characterized as being of short length (e.g., less than twice the wavelength of the characteristic frequency of the qubits and/or buses (about 1 cm or less)) and as having a defined number of channels between at least two connected modules of the one or more modules, while l-type couplers can be characterized as being longer (e.g., from 5 cm to several meters in length).

The p-type couplers can refer to a classical mode of communication which can be connected to the plurality of modules, and which can transmit information from any of the modules, analyze the data received, and transmit instructions to any of the other modules, all within a time window which is of the order of a coherence time (T1) of qubits contained in the modules. A quantum computing system comprised of modules with at least two or all three types of connectivity (p-type, m-type and l-type) can offer significant advantages in computational capabilities. For example, by combining different modularities using a combination of classical, short-range and/or long-range couplers, issues with limits in scaling by cooling density, running dynamic circuits across a chip and/or running substantial algorithms (i.e., entanglement distillation) requiring a larger number of qubit chips can be overcome.

According to one or more embodiments, utilization of all types of connectivity (p-type, m-type and l-type) can permit computations involving very large numbers of qubits.

BRIEF DESCRIPTION OF THE DRAWINGS

FIG. 23 illustrates an example, non-limiting method that facilitates modular quantum systems with discreet levels of connectivity.

DETAILED DESCRIPTION

Figure 1:
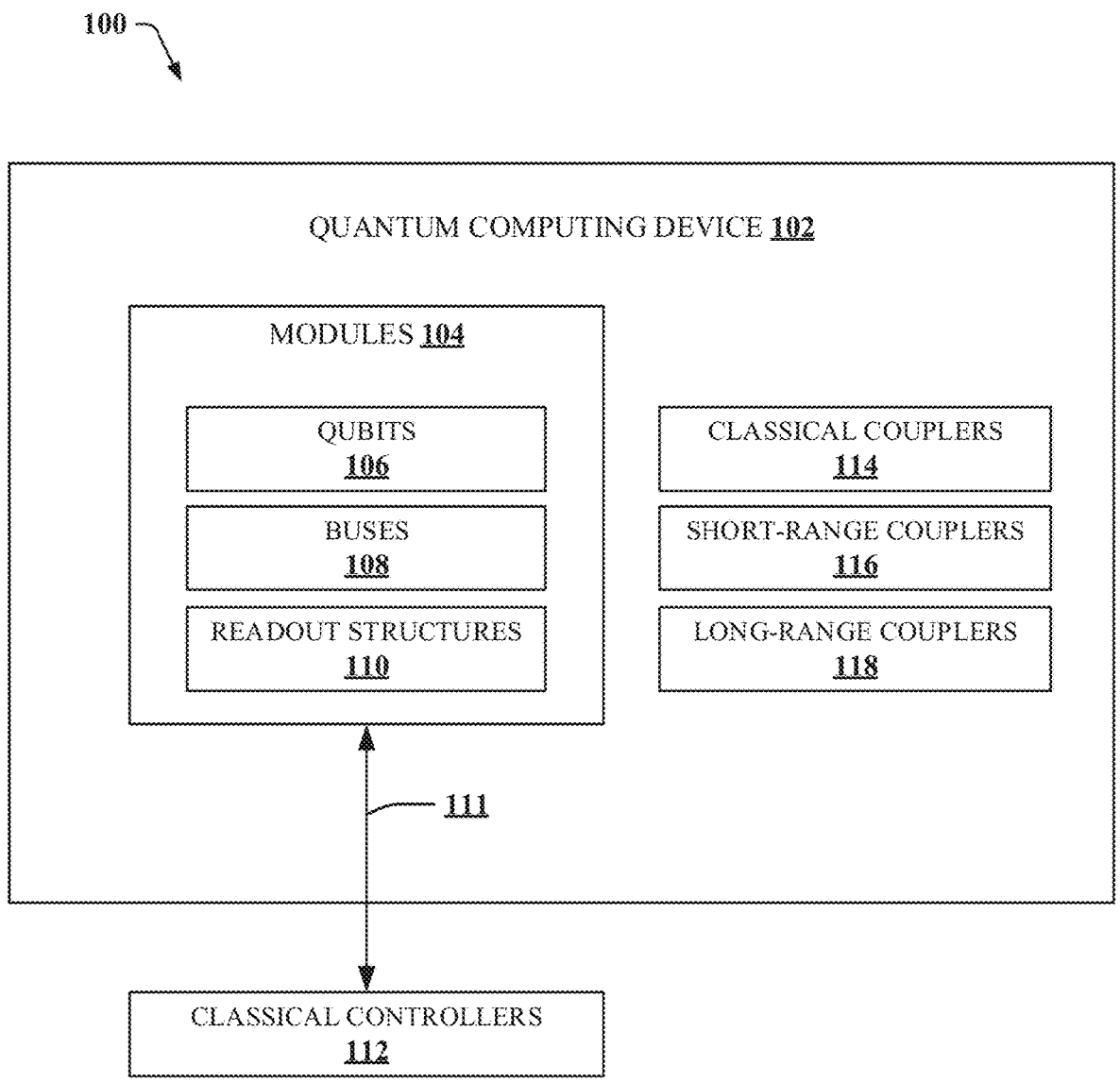
FIG. 1 illustrates a schematic view of a system, in accordance with one or more embodiments described herein.

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

Modular quantum processors can be required to solve challenges experienced with increasing the number of qubits on monolithic chips. These problems can relate to difficulty of chip test/screening, device yield, reliability, and manufacturability. Further advantages can be offered by use of modularities for relieving input/output (I/O) bottlenecks in dense qubit arrays, sidestepping the capacity requirements associated with available dilution refrigerators, easy replacement or upgrading of portions of the system, and allowing the exploration (or taking advantage of) heterogeneous systems.

Approaches described herein can provide different levels of modularities, namely, a p-level modularity, an l-level modularity and an m-level modularity, and combinations thereof, wherein a combination of the modularities can be more powerful than individual modularities. An l-level modularity can permit quantum communication over relatively long distances. A p-level modularity can permit use of classical communication between quantum processors. An m-level modularity can permit quantum computation between different quantum processors that can be separate and distinct and that can reside on separate and distinct substrates, while preserving the underlying lattice symmetry across the quantum processor chips. Each type of modularity can have distinct advantages. Therefore, a desirable solution can be the implementation of a combination of at least any two types of a p-level modularity, an m-level modularity, or an l-level modularity.

It is to be appreciated that the terms "qubit chip/s", "module/s", "quantum processing chip/s", and "quantum processing unit/s" are used interchangeably throughout the scope of this specification. Thus, a quantum processor can comprise one or more qubit chips (quantum processing chips or quantum processing units). It is to be further appreciated that terms "l-level coupler/s", "l-couplers", and "l-type coupler/s" are used interchangeably, and the terms "m-level coupler/s", "m-couplers", and "m-type coupler/s" are also used interchangeably throughout the scope of this specification. Similarly, the terms "p-level coupler/s", "p-couplers", and "p-type coupler/s" are used interchangeably throughout the scope of this specification. Thus, l-level couplers, l-couplers, or l-type couplers can facilitate l-level coupling and modularity, m-level couplers, m-couplers, or m-type couplers can facilitate m-level coupling and modularity, and p-level couplers, p-couplers, or p-type couplers can facilitate p-level coupling and modularity.

In various embodiments of the invention discussed in this application, high fidelity multi-qubit devices across separate quantum processor chips, including quantum processor chips on separate and distinct substrates, can allow for the realization of scalable quantum processors out of smaller modular units with higher yield, and reduced tolerances on frequency control. Such systems can be field repaired in cases where there are broken or defective modules, without having to replace the entire quantum processor, which can further facilitate modular qubit devices wherein qubits can be connected to transmission line resonators, wherein the transmission line resonators can be either capacitively or inductively coupled to each other. In an embodiment, the qubits and transmission line resonators can be on separate physical chips with no galvanic connection between them to enable modularity.

In various embodiments of the invention, devices, systems and/or methods for generating a pulse to affect a qubit can relate to a first qubit chip and a second qubit chip electrically coupled to the first qubit chip via a plurality of coupling elements via capacitive, inductive, and/or galvanic coupling.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Further, it will be appreciated that the embodiments depicted in one or more figures described herein are for illustration only, and as such, the architecture of embodiments is not limited to the devices and/or components depicted therein, nor to any particular order, connection and/or coupling of devices and/or components depicted therein.

FIG. 1 illustrates a schematic view of a system, in accordance with one or more embodiments described herein. FIG. 1 illustrates environment 100, wherein environment 100 can be a quantum computing environment comprising quantum computing device 102. Quantum computing device 102 can comprise one or more of modules 104. Modules 104 can further comprise at least qubits 106, buses 108, and readout structures 110, wherein at least the qubits 106, buses 108, and readout structures 110 can be coupled by any combination of classical couplers 114, short-range couplers 116 and/or long-range couplers 118. Modules 104 can further comprise wiring, readout filters and other components that are not illustrated in FIG. 1. Modules 104 can be connected to one or more of classical controllers 112, via a connection 111, external to a cryogenic environment of modules 104. In one or more embodiments, the qubits 106, buses 108, and readout structures 110 can be connected by one or more of any one type of coupler out of the group comprising classical couplers 114, short-range couplers 116 and long-range couplers 118.

Figure 2:
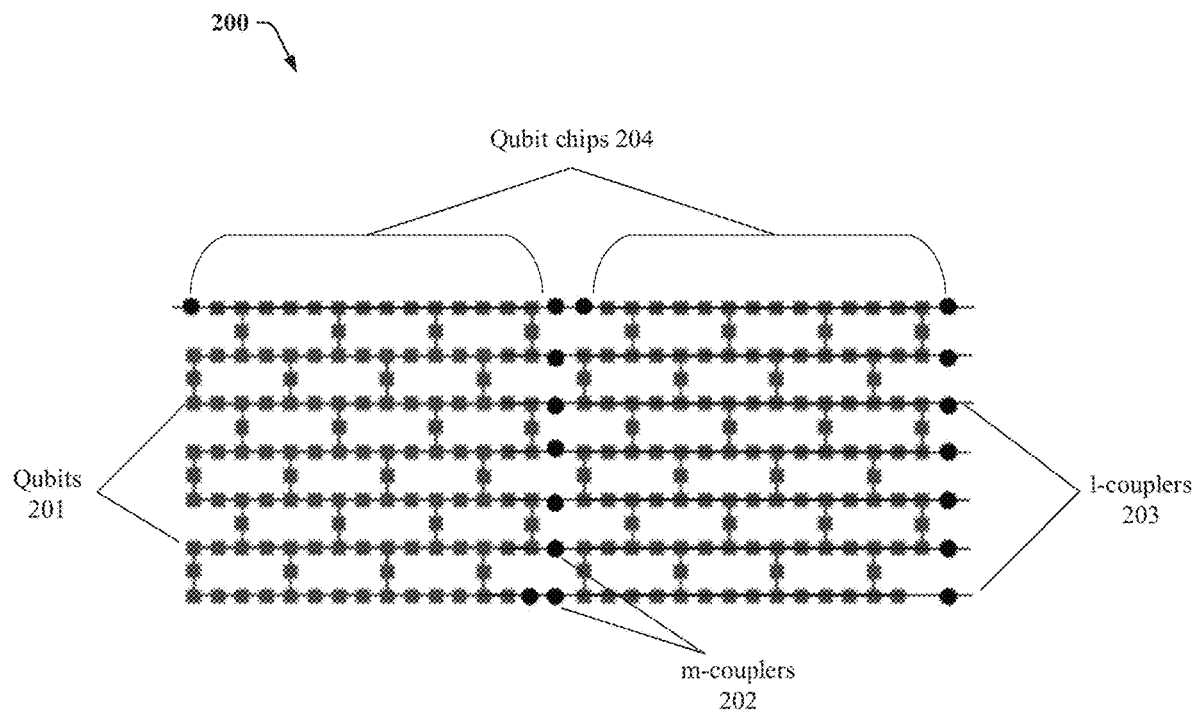
FIG. 2 illustrates an example, non-limiting schematic of an exemplary qubit lattice with couplers between adjacent qubit chips in accordance with one or more embodiments described herein.

FIG. 2 illustrates an example, non-limiting schematic of an exemplary qubit lattice 200 with couplers between adjacent qubit chips in accordance with one or more embodiments described herein. FIG. 2 illustrates qubits 201, m-couplers 202, and l-couplers 203.

With m-level coupling and m-level modularity (illustrated at the center of FIG. 2, between adjacent qubit chips 204) provided by m-couplers 202, and l-level coupling and l-level modularity (illustrated at the right-hand side of FIG. 2) provided by l-couplers 203, the connectivity of qubits 201 on qubit chips 204 and arrangement of the modular couplers can permit qubit lattice 200 to be extended to encompass multiple quantum processor chips such as qubit chips 204. M-couplers 202 can be provided in the form of capacitive, inductive, or galvanic coupling.

Figure 3A:
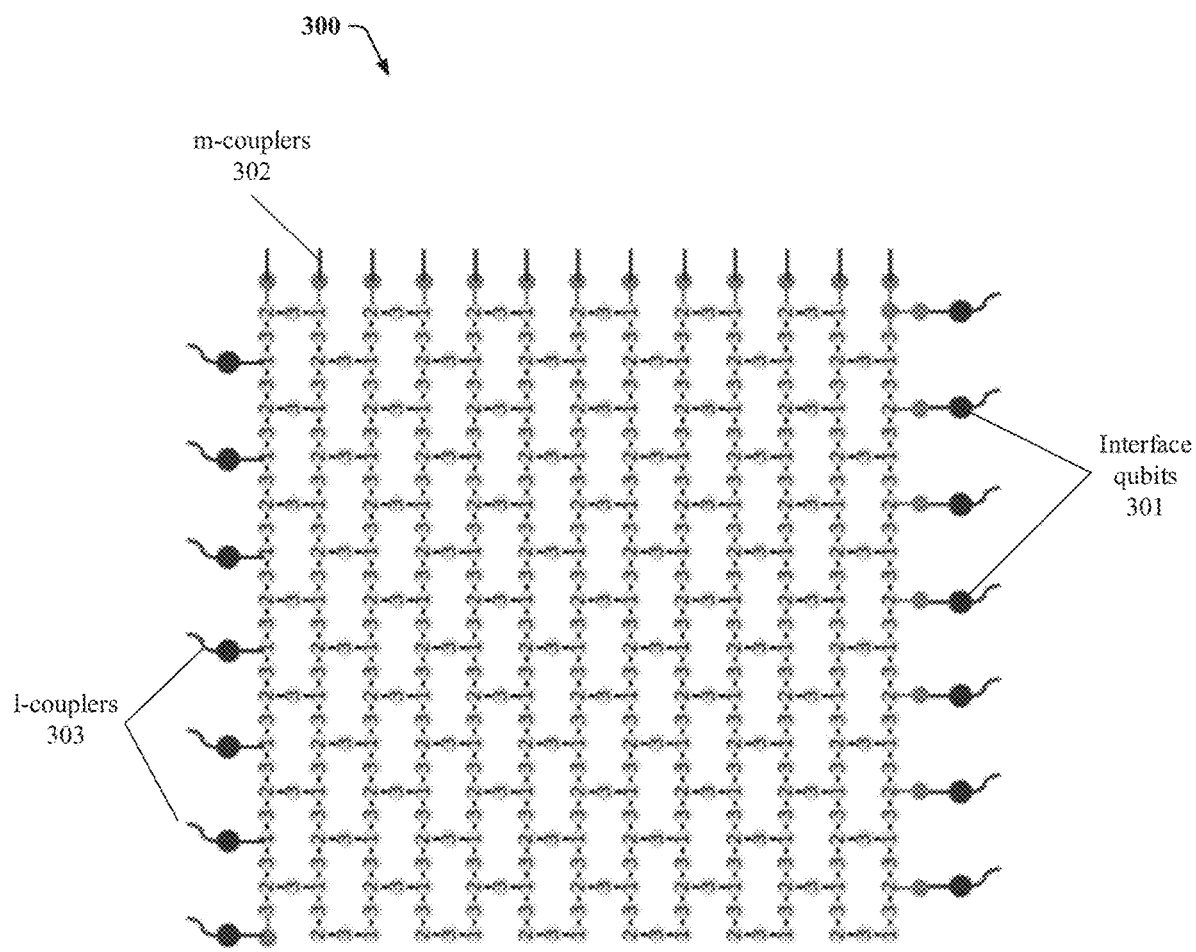
FIG. 3A illustrates an example, non-limiting arrangement of a qubit lattice that can be extended via l-type couplers and m-type couplers in accordance with one or more embodiments described herein.
Figure 3B:
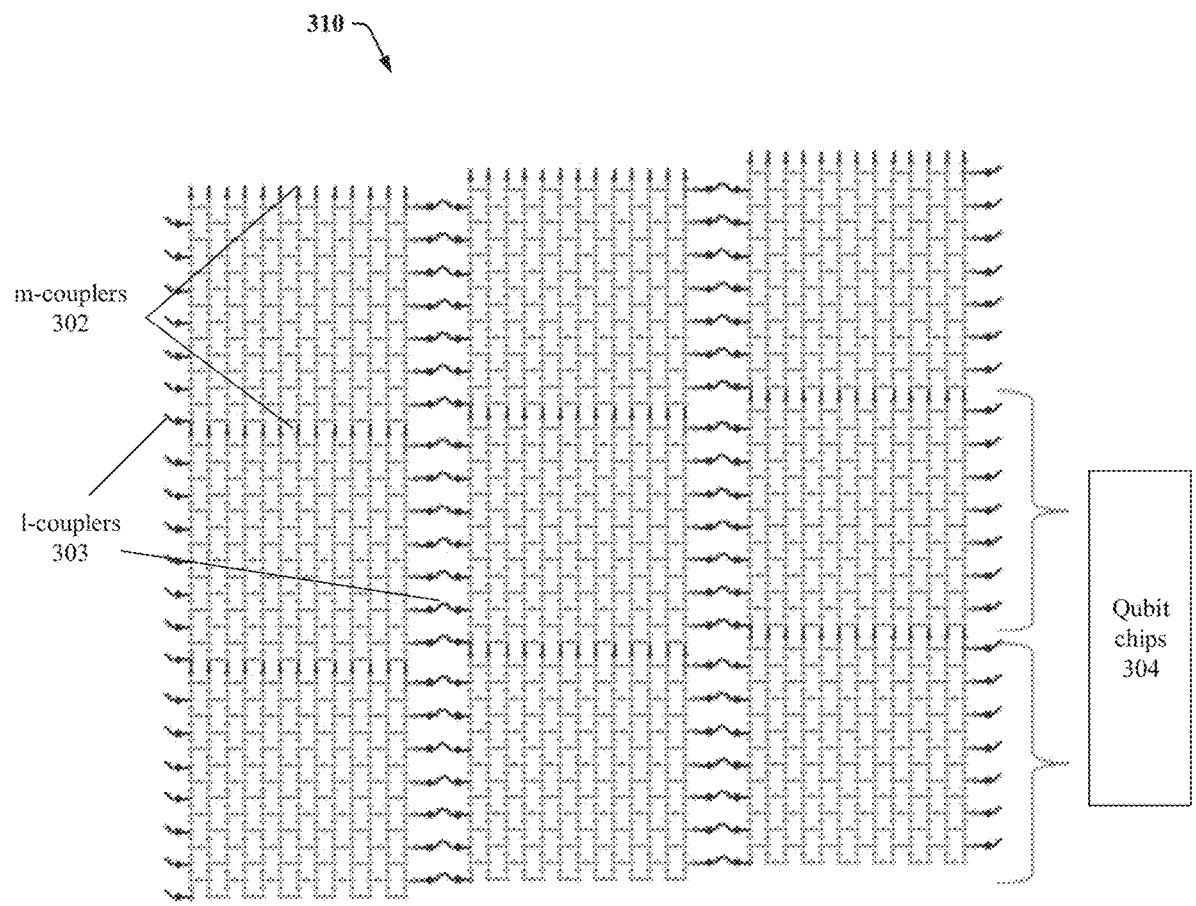
FIG. 3B illustrates an example, non-limiting arrangement of an extended qubit lattice in accordance with one or more embodiments described herein.

FIG. 3A illustrates an example, non-limiting arrangement of a qubit lattice 300 that can be extended via l-type couplers and m-type couplers in accordance with one or more embodiments described herein. FIG. 3B illustrates an example, non-limiting arrangement of an extended qubit lattice 310 in accordance with one or more embodiments described herein. Repetitive description of like elements and/or processes employed in respective embodiments is omitted for sake of brevity.

The qubit lattice 300 can be a heavy hex lattice (d=13 nodes) that can be extended by m-couplers 302 and l-couplers 303. It is to be appreciated that the disclosure is not limited to a heavy hex lattice such as qubit lattice 300. Further, the extended qubit lattice 310 illustrates 9 qubit chips 304, with 3 qubit chips in each column. Adding 15 qubits to a core lattice (e.g., a core lattice of 433 qubits (d=13 nodes)) for "m-level" tileability and adding 7 qubits associated with the "l-type" connectivity (455 qubits total) can facilitate extension of the heavy hex lattice (e.g., qubit lattice 300), wherein l-coupler interface qubits such as interface qubits 301 can be treated as part of the l-coupler such as l-couplers 303. Such a connection can facilitate permeating information through the qubit chips such that the interconnectedness and the geometrical integrity of a qubit lattice such as qubit lattice 300 can be preserved.

As discussed in one or more embodiments herein, the m-type couplers can be characterized as being of short length (e.g., less than twice the wavelength of the characteristic frequency of the qubits and/or buses (about 1 cm or less)) and as having a defined number of channels between at least two connected modules of the one or more modules, while l-type couplers can be characterized as being longer (e.g., from 5 cm to several meters in length). Herein, the number of channels can depend on the layout of the qubit chip. For example, for a heavy hexagonal arrangement of the chips, the m-couplers can be placed in the lattice so as to replace the other types of couplers (i.e., p-type couplers and l-type couplers). This can further depend on how the qubit lattice is cut, and it can be advantageous to choose a cut that can minimize the connections required between two modules. For example, FIG. 3A shows 13 m-couplers along the top of the array, however, the number of channels required can depend on the number of qubits and a layout of the qubits (i.e., how the qubits are laid out and connected). This can also hold true for l-type couplers.

Figure 4:
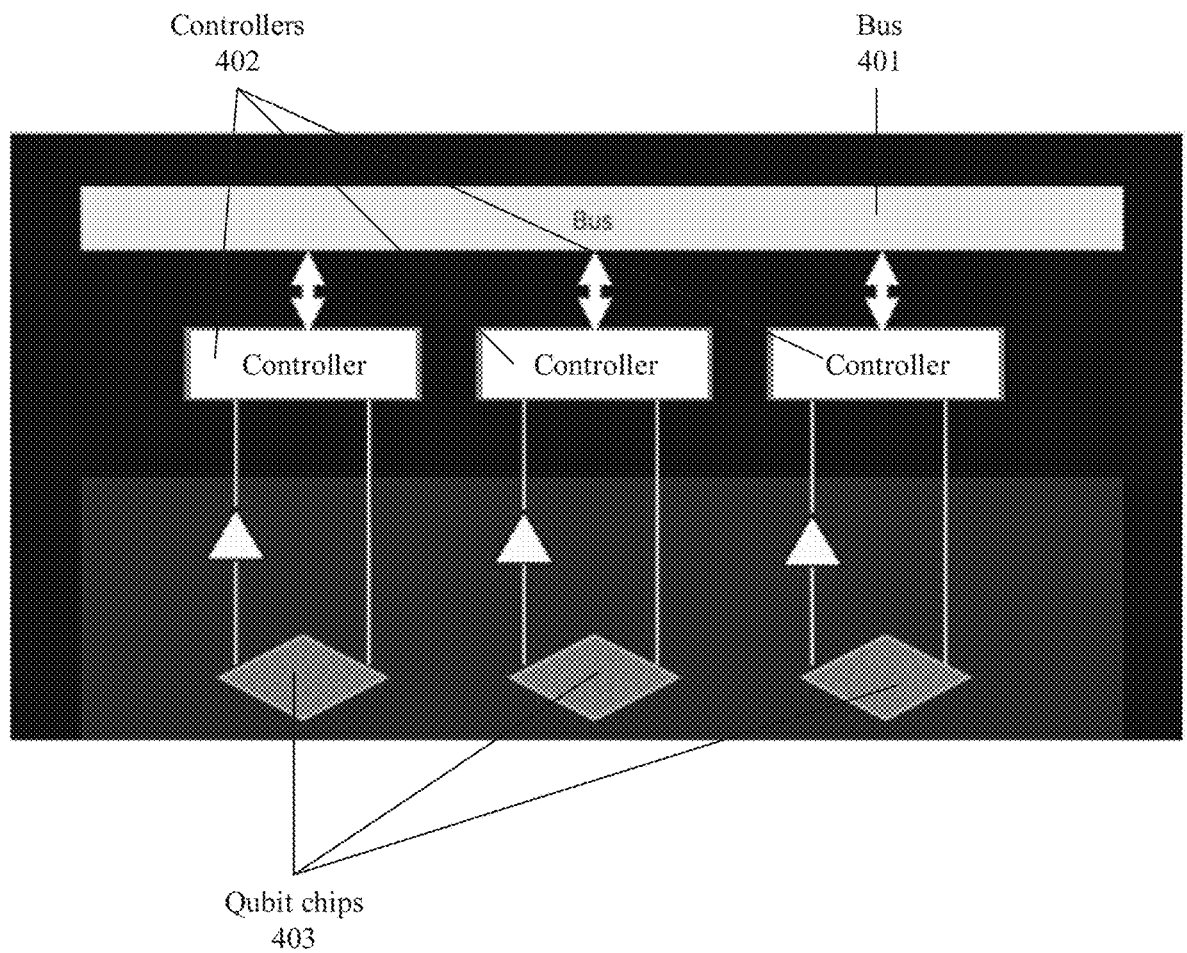
FIG. 4 illustrates a p-level modularity in accordance with one or more embodiments described herein.

FIG. 4 illustrates a p-level modularity in accordance with one or more embodiments described herein. Repetitive description of like elements and/or processes employed in respective embodiments is omitted for sake of brevity.

A p-level modularity can be a structure in which more than one qubit chip, for example qubit chips 403, can be connected to a classical mode of communication, such as bus 401, via one or more classical qubit controllers, such as controllers 402. In the case of one controller (e.g., one of the controllers 402), the controller can measure the state of a qubit on one chip (e.g., one of the qubit chips 403) and conditioned on that measurement, conditionally perform one or more operations on another chip (e.g., another one of the qubit chips 403). The latency of this operation can be less than 1 microsecond(s) (µs), and thus the operation can happen more than one time within the coherence time of the qubits on qubit chips 403, wherein the coherence time of the qubits can be greater than 100 µs. P-level coupling can be achieved, e.g., with classical buses such as bus 401 coupled to microwave I/O interfaces for communicating with qubits.

In the case of multiple controllers such as controllers 402, the operation of individual controllers can be the same as in the case of a singular controller, but a first controller can read a qubit and the first controller can pass the qubit state on bus 401 to a second controller that can run a conditional operation. The second controller can perform a computation on a qubit state and previously measured state, and bus 401 can have an active processing unit that can perform the computation. This can be further illustrated by the following sequence of FIGS. 5A through 10B.

Figure 5A:
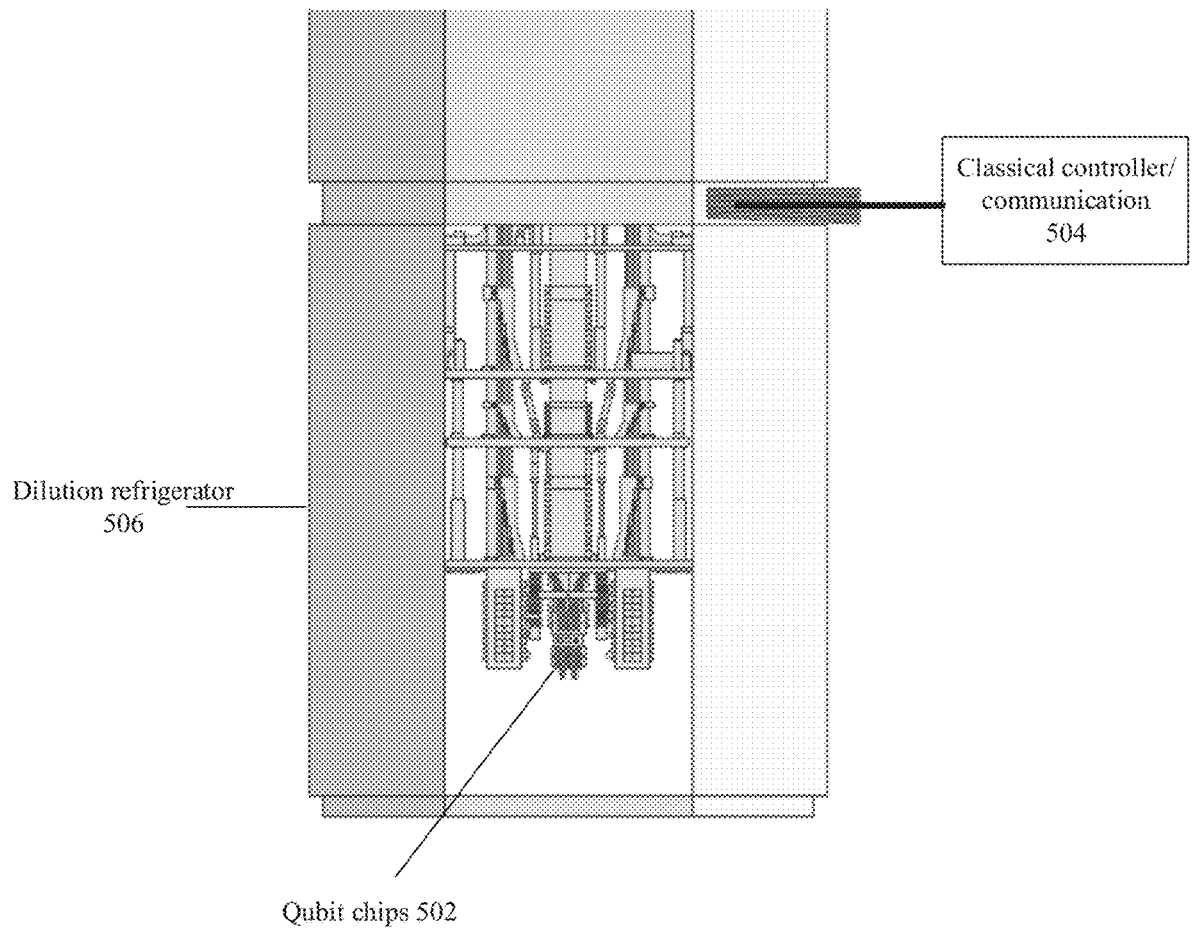
FIG. 5A illustrates a dilution refrigerator in accordance with one or more embodiments described herein.
Figure 5B:
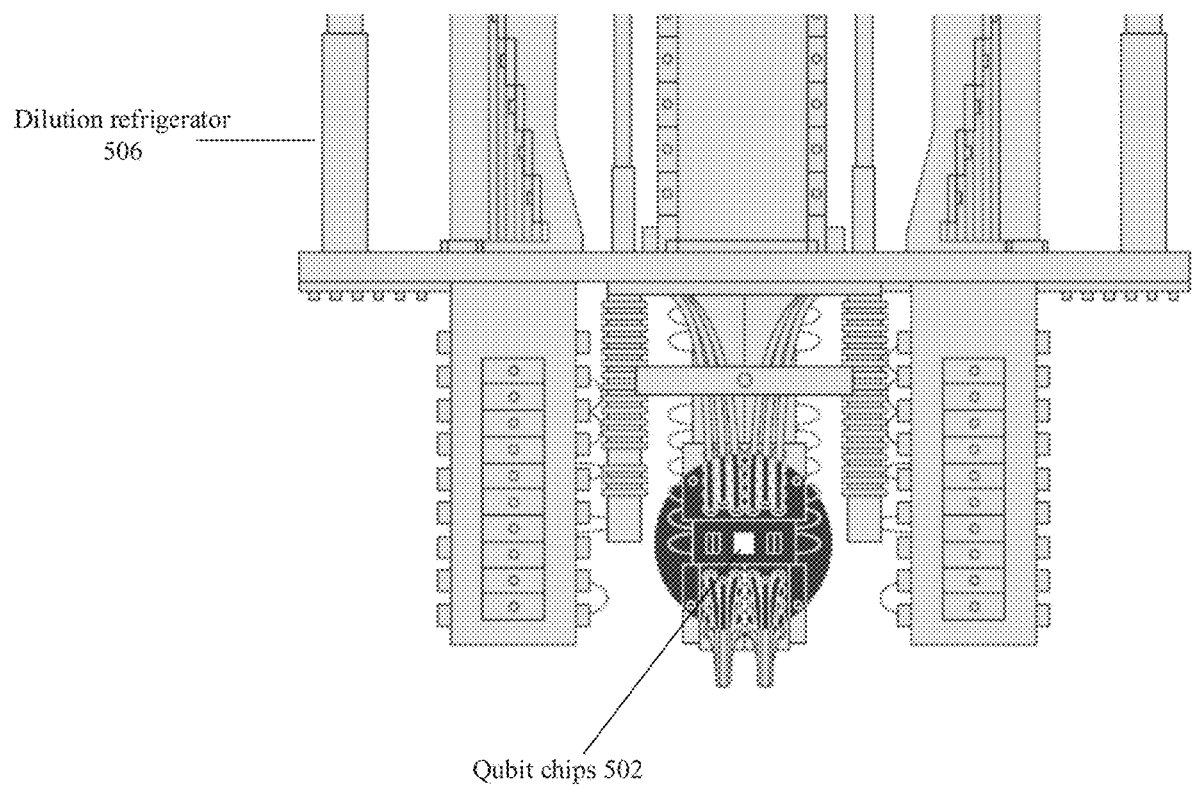
FIG. 5B further illustrates a dilution refrigerator in accordance with one or more embodiments described herein.

FIG. 5A and FIG. 5B illustrate a dilution refrigerator in accordance with one or more embodiments described herein. Repetitive description of like elements and/or processes employed in respective embodiments is omitted for sake of brevity.

FIGS. 5A and 5B illustrate qubit chips 502 housed within dilution refrigerator 506. FIG. 5A further illustrates classical controller/communication 504, that can be connected to the dilution refrigerator 506. Any combination of the different types of couplers (e.g., classical couplers, short-range couplers, and long-range couplers) discussed in one or more embodiments herein, can extend connectivity of qubit chips comprised within individual dilution refrigerator such as dilution refrigerator 506, to enable quantum computing with classical communications.

Figure 6A:
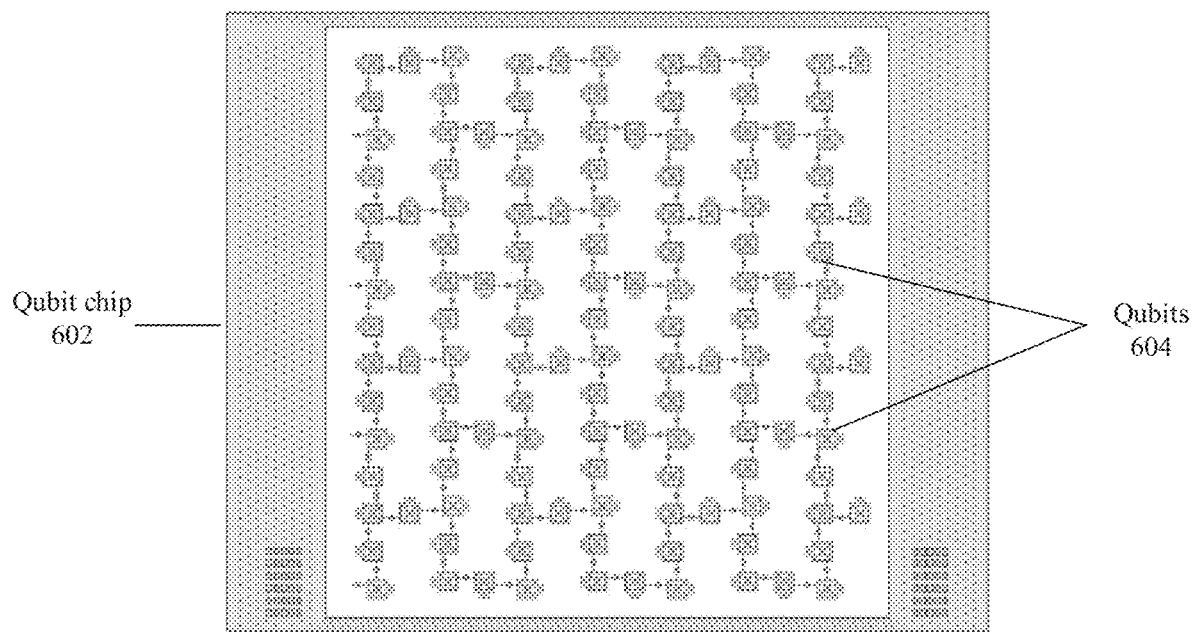
FIG. 6A illustrates an exemplary qubit chip in accordance with one or more embodiments described herein.
Figure 6B:
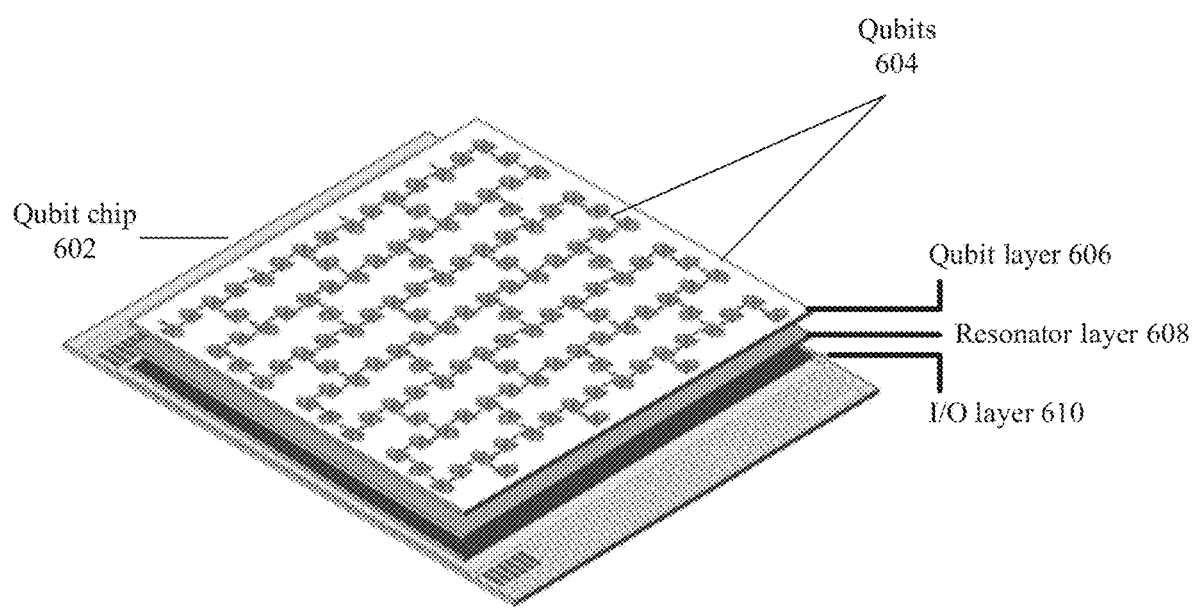
FIG. 6B further illustrates an exemplary qubit chip in accordance with one or more embodiments described herein.
Figure 6C:
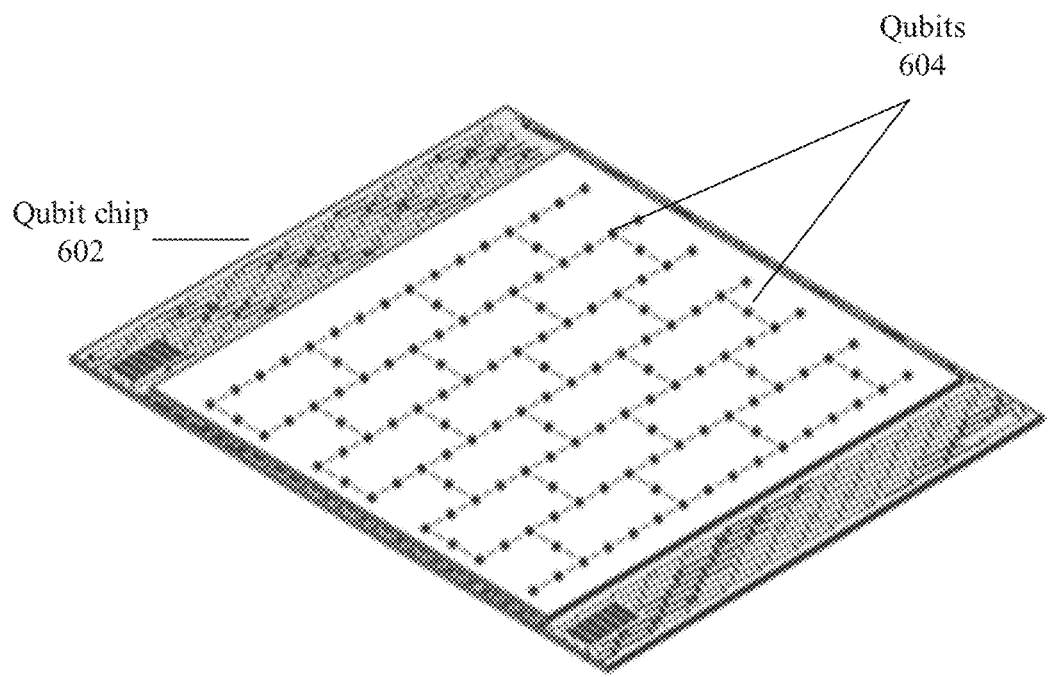
FIG. 6C further illustrates an exemplary qubit chip in accordance with one or more embodiments described herein.

FIG. 6A, FIG. 6B and FIG. 6C illustrate an exemplary qubit chip in accordance with one or more embodiments described herein. Repetitive description of like elements and/or processes employed in respective embodiments is omitted for sake of brevity.

FIGS. 6A, 6B, and 6C illustrate qubit chip 602 and qubits 604. Qubit chip 602 can be an individual qubit chip that can be housed inside dilution refrigerator 506 of FIGS. 5A and 5B. FIG. 6B further illustrates qubit layer 606, resonator layer 608, and input/output layer 610 (I/O layer 610).

Figure 7:
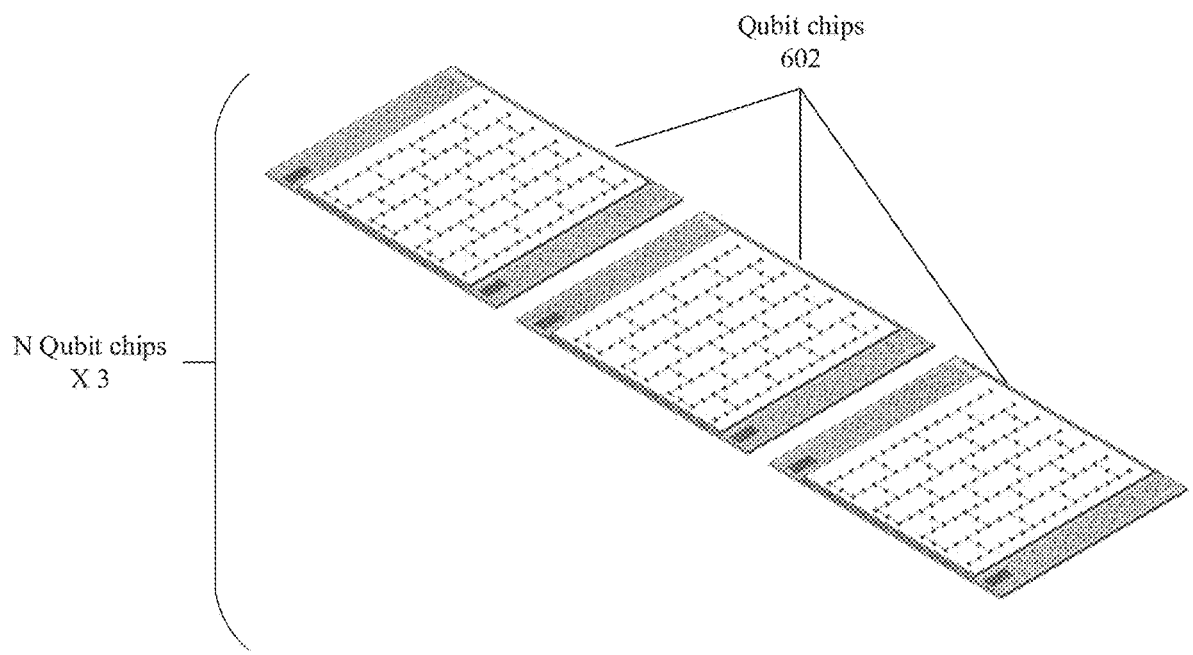
FIG. 7 illustrates multiple qubit chips (quantum processing chips or QPUs) that can be connected in a p-level modularity in accordance with one or more embodiments discussed herein.

FIG. 7 illustrates multiple qubit chips (quantum processing chips or QPUs) that can be connected in a p-level modularity in accordance with one or more embodiments discussed herein. Repetitive description of like elements and/or processes employed in respective embodiments is omitted for sake of brevity.

FIG. 7 comprises three qubit chips 602 of FIG. 6. Subsequently, FIGS. 8A through 8B can illustrate how p-type couplers can facilitate classical parallelization of multiple qubit chips 602.

Figure 8A:
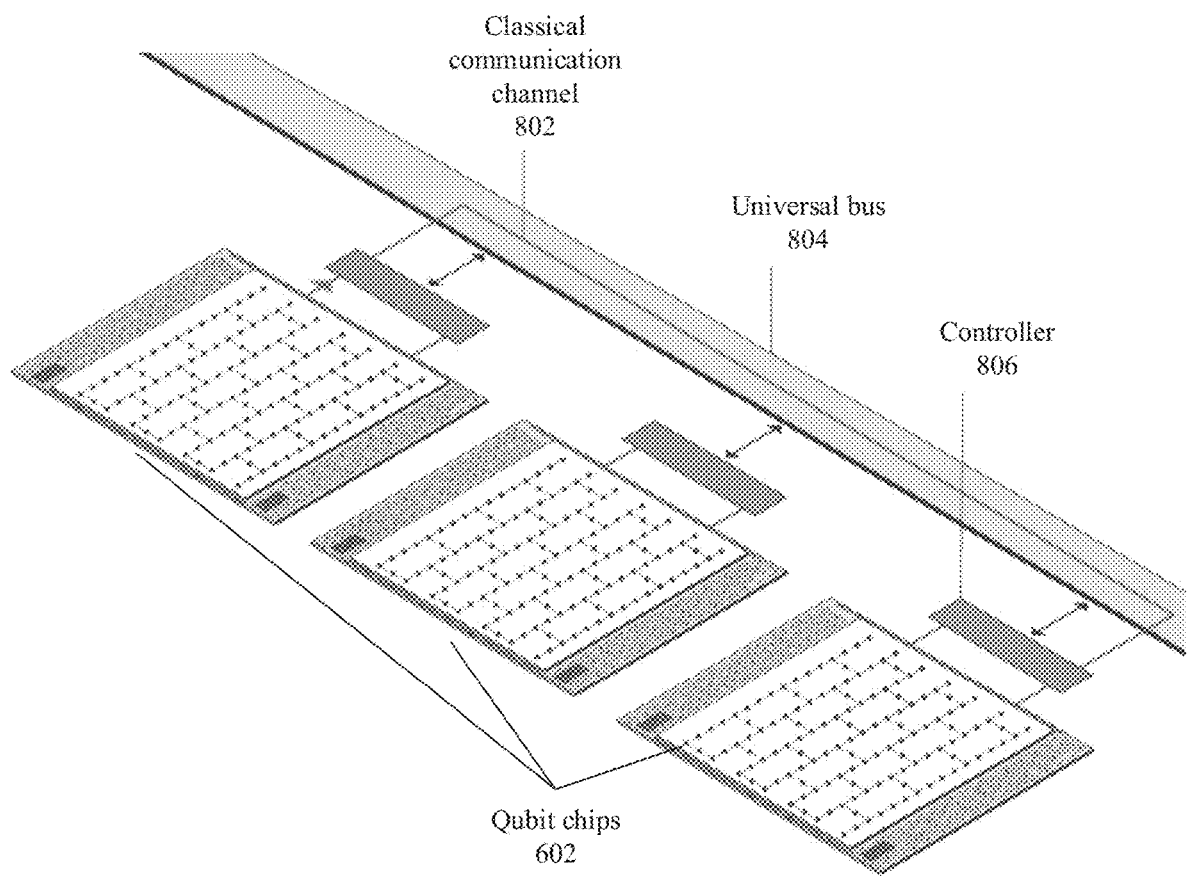
FIG. 8A illustrates classical parallelization of QPUs in accordance with one or more embodiments described herein.

FIG. 8A illustrates classical parallelization of QPUs in accordance with one or more embodiments described herein. Repetitive description of like elements and/or processes employed in respective embodiments is omitted for sake of brevity.

Multiple qubit chips 602 can be connected to one or more classical qubit controllers such as controller 806. Controller 806 can pass the qubit state via universal bus 804, that can comprise classical communication channel 802, to another controller, that can then run a conditional operation. Thus, classical information can leave one quantum fridge (cryogenically controlled cryostat to achieve low temperatures) and return to the same fridge or travel to a different fridge.

Figure 8B:
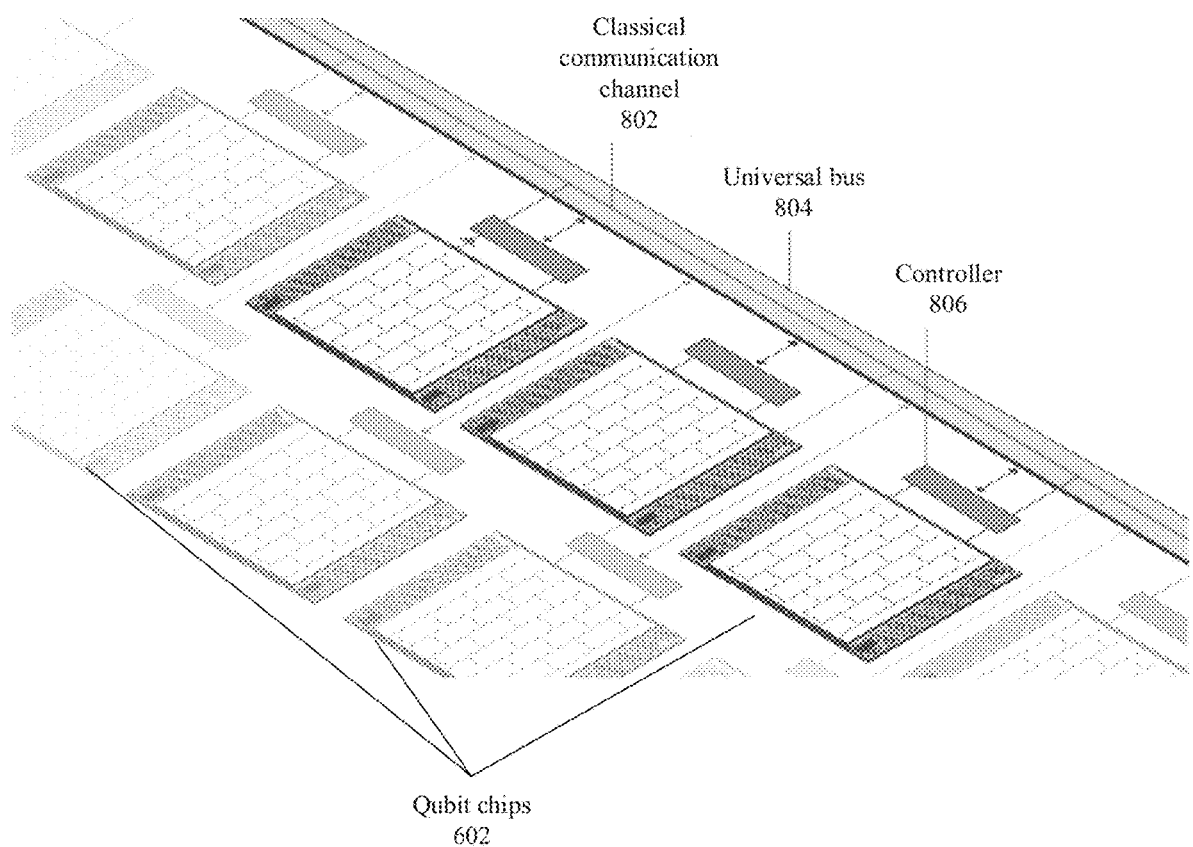
FIG. 8B further illustrates classical parallelization of QPUs via p-type couplers in accordance with one or more embodiments described herein.

FIG. 8B further illustrates classical parallelization of QPUs via p-type couplers in accordance with one or more embodiments described herein. Repetitive description of like elements and/or processes employed in respective embodiments is omitted for sake of brevity. Several rows of qubit chips 602 can be arranged to facilitate classical parallelization of quantum processors via classical communication channel 802, universal bus 804, and controller 806. P-type couplers are different from l-type and m-type couplers such that p-type couplers can use existing I/O control and readout lines to send signals to a central processing unit (CPU) at room temperature. The signals can then be processed, and the results can be sent to a separate quantum module at cryogenic temperatures. The operation can happen quickly enough such that quantum information can be held onto each module during the interaction, allowing quantum derived information to span modules (but not quantum coupling per se). Thus, p-type couplers refer to a classical computation unit which is connected to the one or more modules (as opposed to physical connections between modules such as provided by the l-type and m-type couplers).

Figure 9:
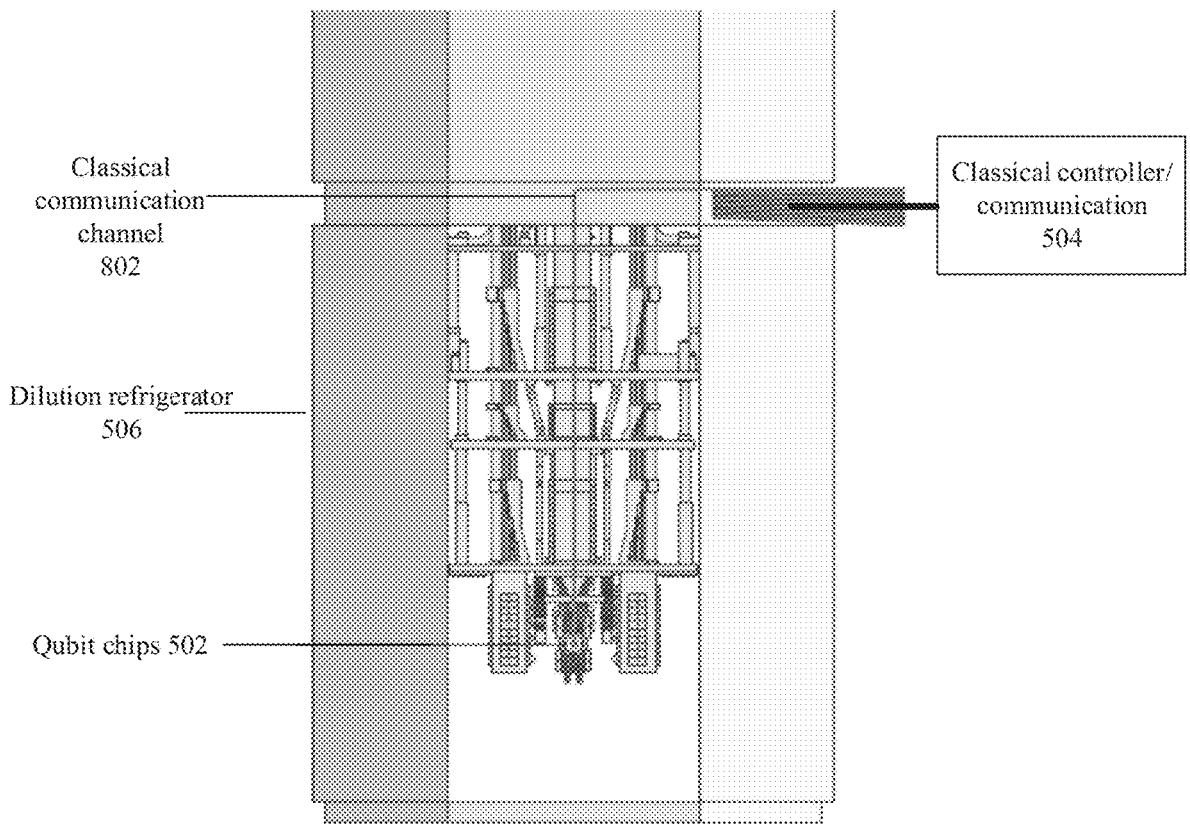
FIG. 9 illustrates classical parallelization of QPUs in accordance with one or more embodiments described herein.

FIG. 9 illustrates classical parallelization of QPUs in accordance with one or more embodiments described herein. Repetitive description of like elements and/or processes employed in respective embodiments is omitted for sake of brevity.

FIG. 9 illustrates the classical parallelization of quantum processors in the context of dilution refrigerator 506 illustrated is FIGS. 5A and 5B. As described in one or more embodiments herein, classical information can leave one quantum fridge (cryogenically controlled cryostat to achieve low temperatures) and return to the same fridge or travel to a different fridge, thereby enabling classical parallelization of quantum processors.

Figure 10A:
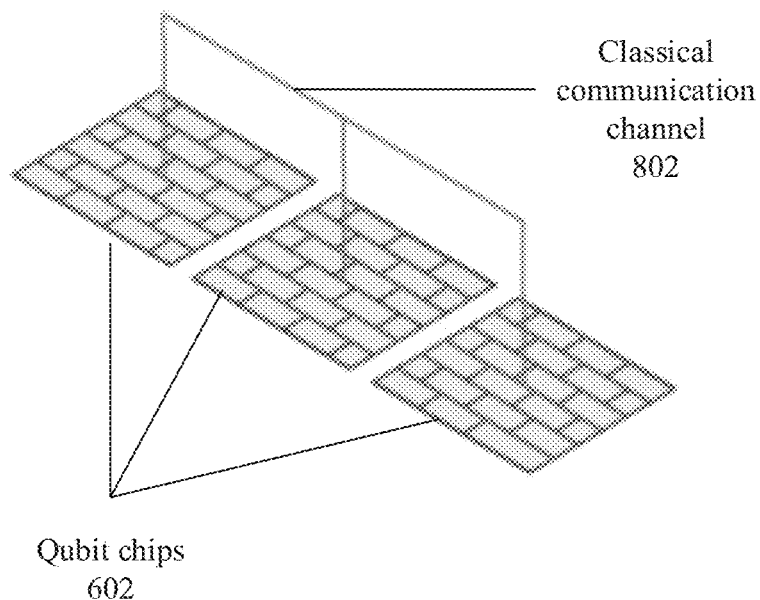
FIG. 10A further illustrates classical parallelization of QPUs in accordance with one or more embodiments described herein.
Figure 10B:
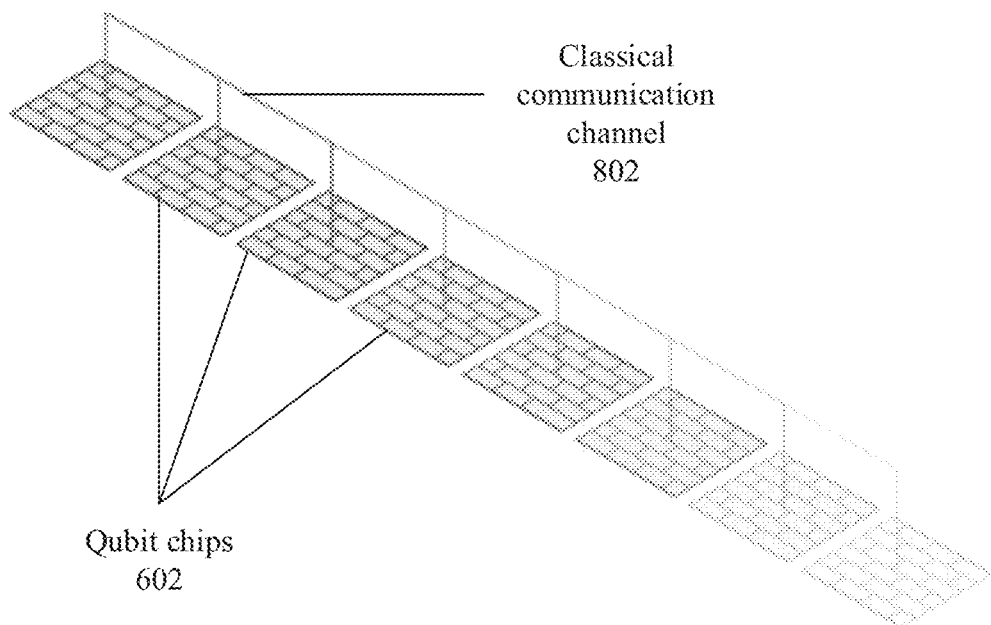
FIG. 10B further illustrates classical parallelization of QPUs in accordance with one or more embodiments described herein.

FIG. 10A and FIG. 10B further illustrate classical parallelization of QPUs in accordance with one or more embodiments described herein. Repetitive description of like elements and/or processes employed in respective embodiments is omitted for sake of brevity.

FIG. 10A describes three qubit chips 602 arranged in a p-level modularity whereas FIG. 10B describes "n" qubit chips arranges in a p-level modularity. Thus, classical parallelization of quantum processors can allow for multiple qubit chips to be connected to one another via p-type couplers.

Figure 11:
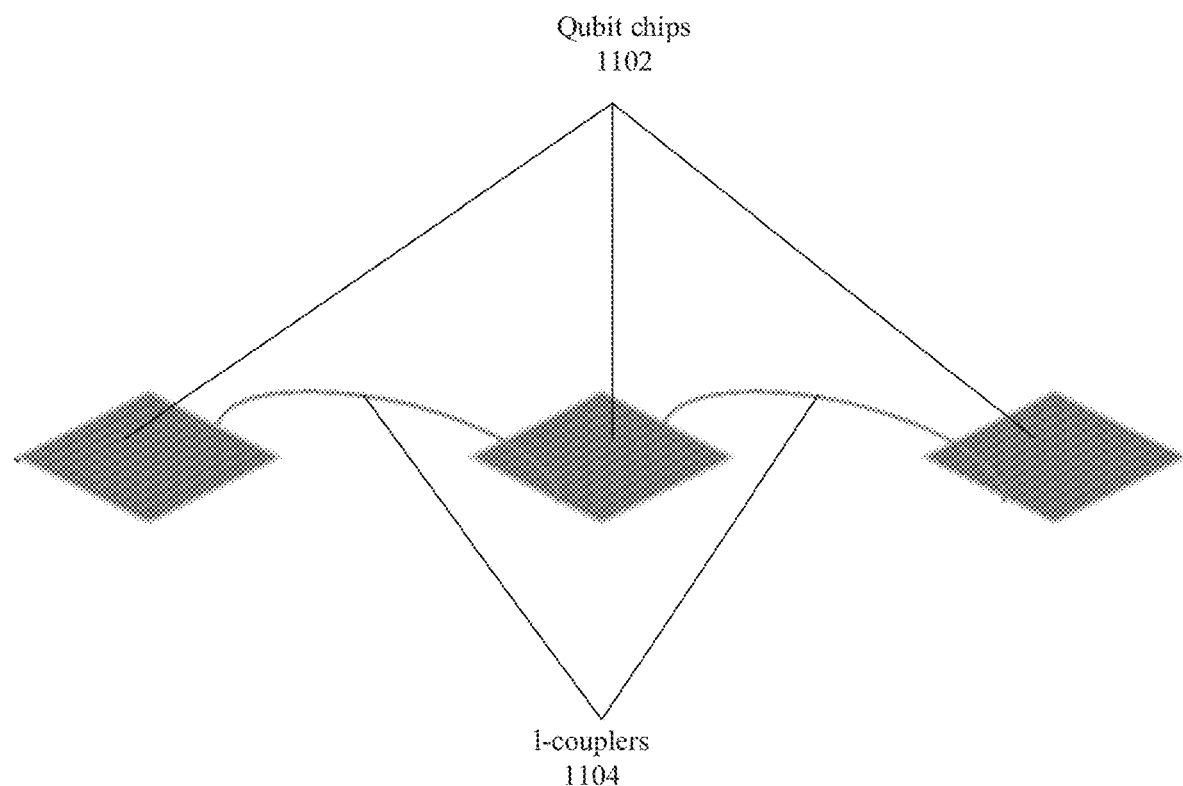
FIG. 11 illustrates an l-level modularity in accordance with one or more embodiments described herein.

FIG. 11 illustrates an l-level modularity in accordance with one or more embodiments described herein. In an l-level modularity, multiple qubit chips 1102, each of which can have a multitude of qubits, can be connected by one or more long-range couplers such as l-coupler 1104. The long-range couplers can be much longer than the wavelength of a qubit's frequency (e.g., from 5 cm to several meters in length), and the long-range couplers can permit quantum operations by means of at least resonator-induced phase (RIP) gates, cross resonance (CR) gates, Fast Flux gates, adiabatic state transfer, and dark state transfer in a time less than the coherence time of the qubits. The long-range couplers can be flexible, permitting them to be used to join distant parts of the same cryogenic environment, and they can be made out of one or more of superconducting coaxial cables, striplines, CPWs, twinax, differential stripline, flexible printed circuit boards, or ribbon cables. They can have a loss of less than 1 dB.

In an l-level modularity such as illustrated by FIG. 11 where each qubit chip (e.g., individual qubit chips of qubit chips 1102) can feature two or more connections to other qubit chips permitting the formation of a chain, wherein the network can be a small world network, an expander graph, or a binary tree, and each chip can feature more than one connection to other chips in the network. Those connections can extend the on-chip qubit lattice to another chip, or a part thereof. As before, the qubit chips 1102 can be dematable, and re-routable by moving cables where each qubit chip (e.g., one qubit chip of qubit chips 1102) can have its own classical control wiring. Some l-couplers (e.g., l-couplers 1104) can go back to the same chip reducing the average distance between qubits, whereas other l-couplers (e.g., l-couplers 1104) can run between separate magnetic shielding cans on one dilution refrigeration stack and/or between separate dilution refrigeration stacks within a shared vacuum vessel. This can be further illustrated by the following sequence of FIGS. 12 through 15.

Figure 12:
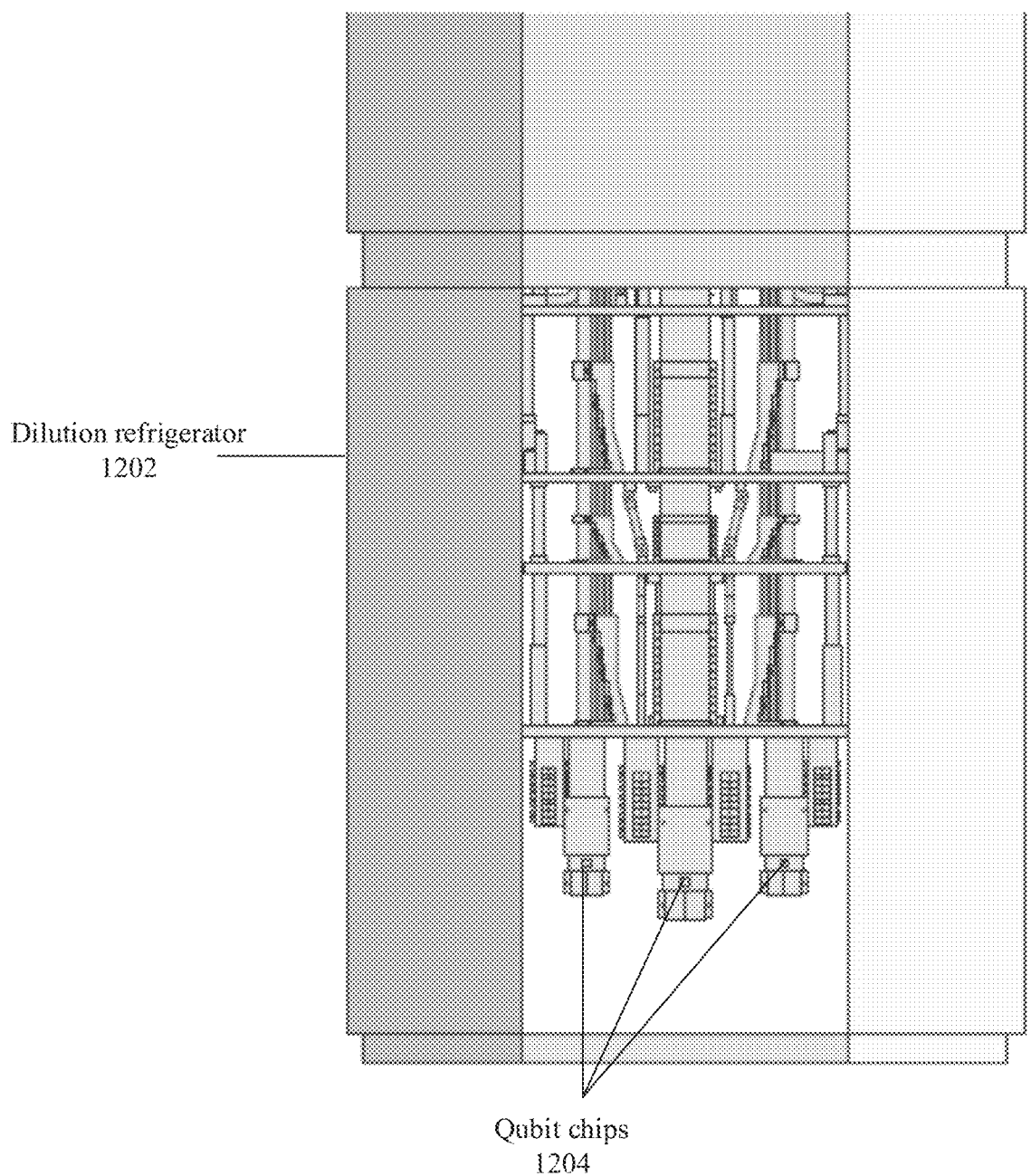
FIG. 12 illustrates a dilution refrigerator in accordance with one or more embodiments described herein.

FIG. 12 illustrates a dilution refrigerator in accordance with one or more embodiments described herein. Repetitive description of like elements and/or processes employed in respective embodiments is omitted for sake of brevity.

FIG. 12 illustrates qubit chips 1204 housed within dilution refrigerator 1202.

Figure 13:
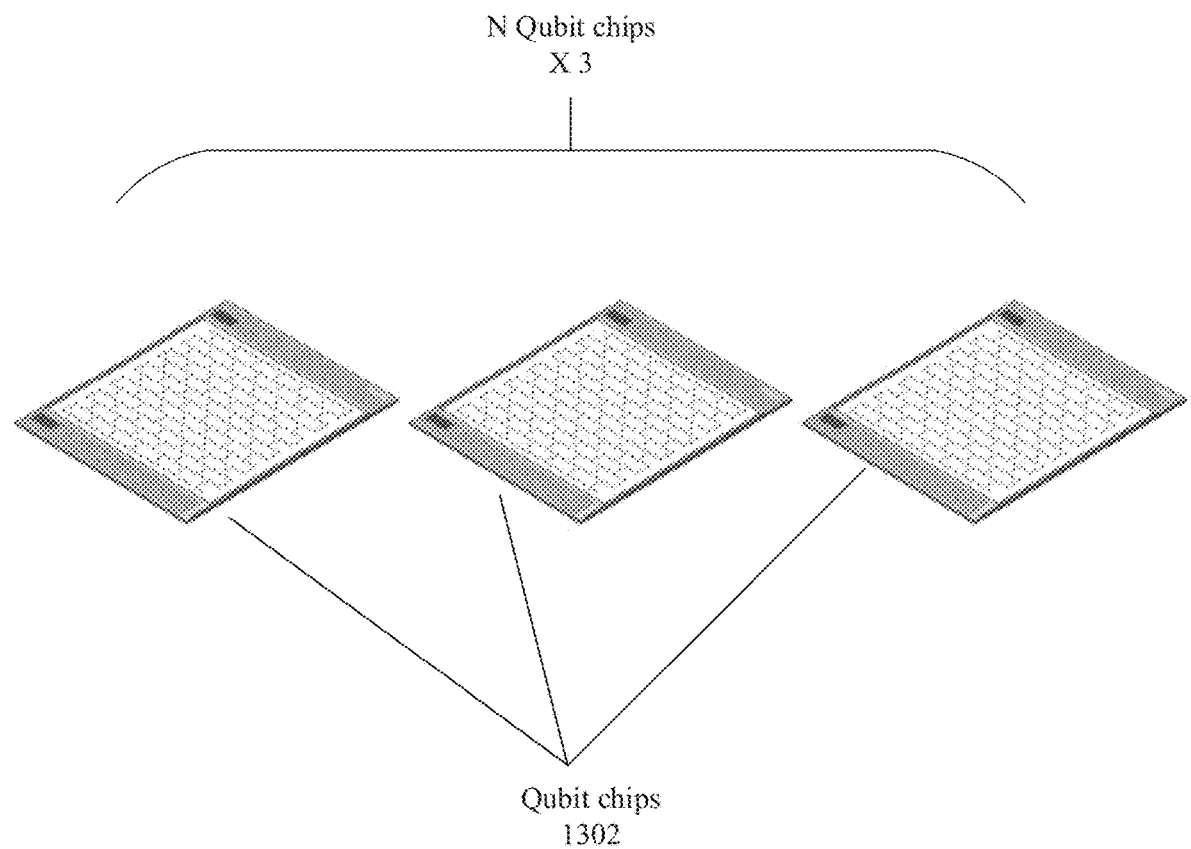
FIG. 13 illustrates multiple qubit chips that can be connected in an l-level modularity via long range cables, in accordance with one or more embodiments described herein.

FIG. 13 illustrates multiple qubit chips that can be connected in an l-level modularity via long range cables (e.g., l-couplers 1104), in accordance with one or more embodiments described herein. Repetitive description of like elements and/or processes employed in respective embodiments is omitted for sake of brevity.

FIG. 13 illustrates three qubit chips 1302 that can be part of qubit chips 1204 of FIG. 12. Subsequently, FIGS. 12 through 15 can illustrate how l-type couplers (e.g., l-couplers 1104) can facilitate quantum parallelization of multiple qubit chips 1302.

Figure 14A:
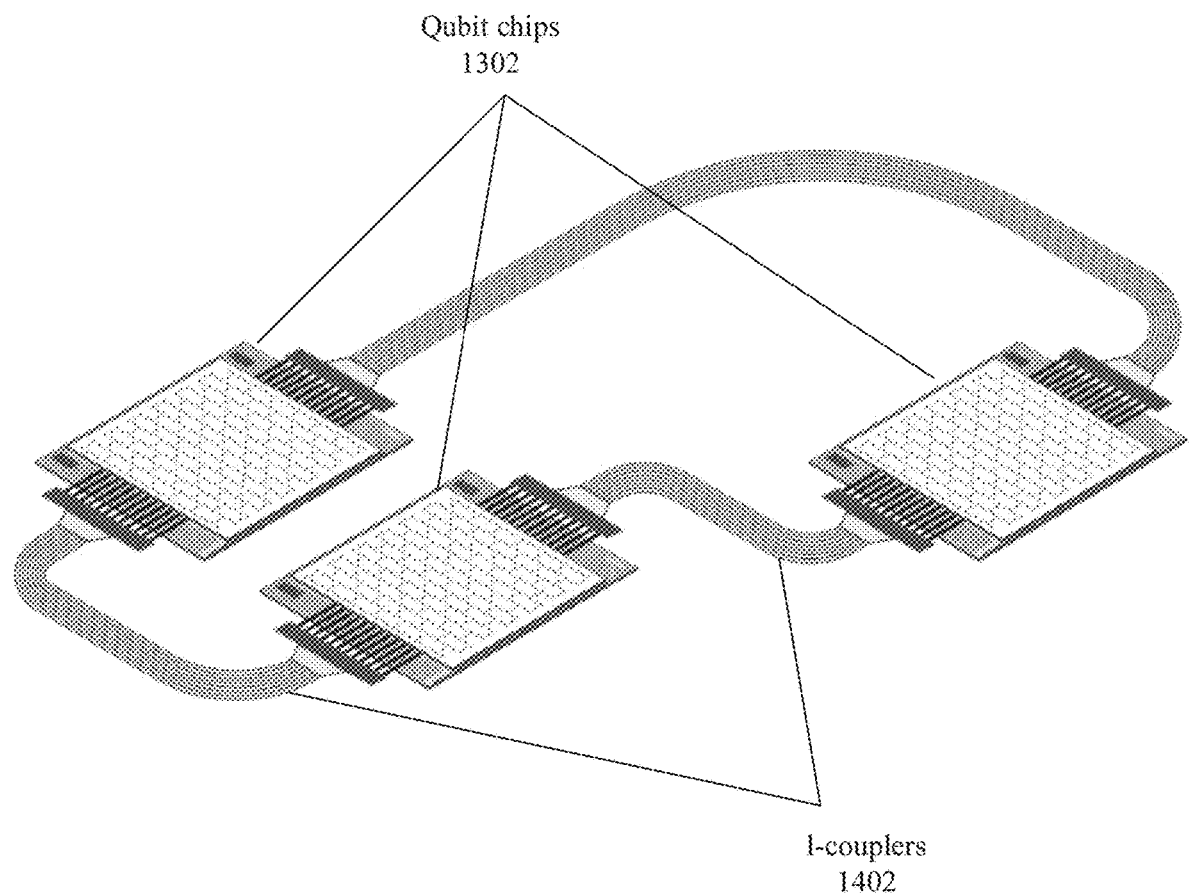
FIG. 14A illustrates quantum parallelization of QPUs in accordance with one or more embodiments described herein.
Figure 14B:
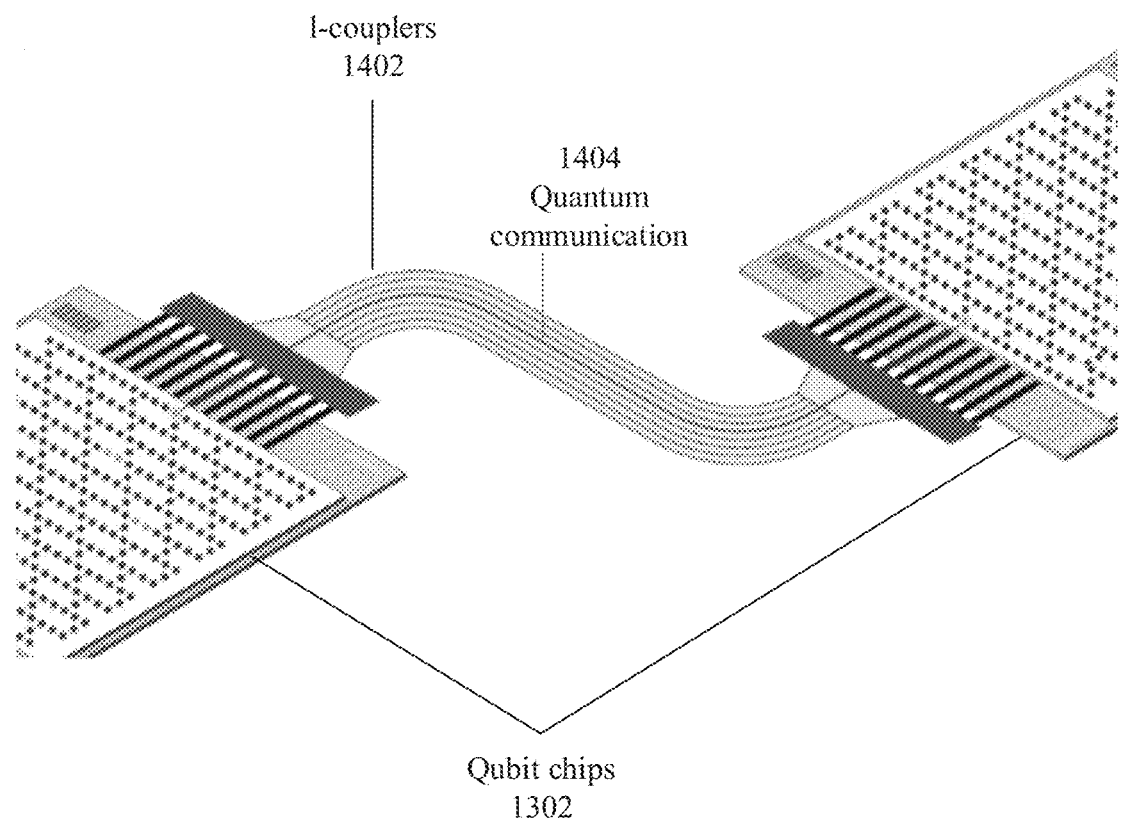
FIG. 14B further illustrates quantum parallelization of QPUs in accordance with one or more embodiments described herein.

FIG. 14A and FIG. 14B illustrate quantum parallelization of QPUs in accordance with one or more embodiments described herein. Repetitive description of like elements and/or processes employed in respective embodiments is omitted for sake of brevity.

As discussed in one or more embodiments herein, multiple qubit chips 1204 can be connected via several long-range cables (e.g., l-couplers 1402) to facilitate quantum parallelization of quantum processors. For example, L-couplers 1402 can form a quantum communication link between qubit chips 1302 of FIG. 13, thereby facilitating an l-level modularity and quantum communication at 1404 between qubit chips 1302.

L-couplers 1402 can be about 1 meter long and they can facilitate introducing physical space into a quantum computing system. The long-range cables (e.g., l-couplers 1402) can enable l-level modularity, and they can be at the same cryogenic temperatures as qubits on qubit chips 1302. L-coupling can be achieved, for example, using cryogenically cooled cables having internal wires that connect one qubit chip 1302 with another qubit chip 1302, for example, via capacitive coupling or inductive coupling or galvanic coupling.

Figure 14C:
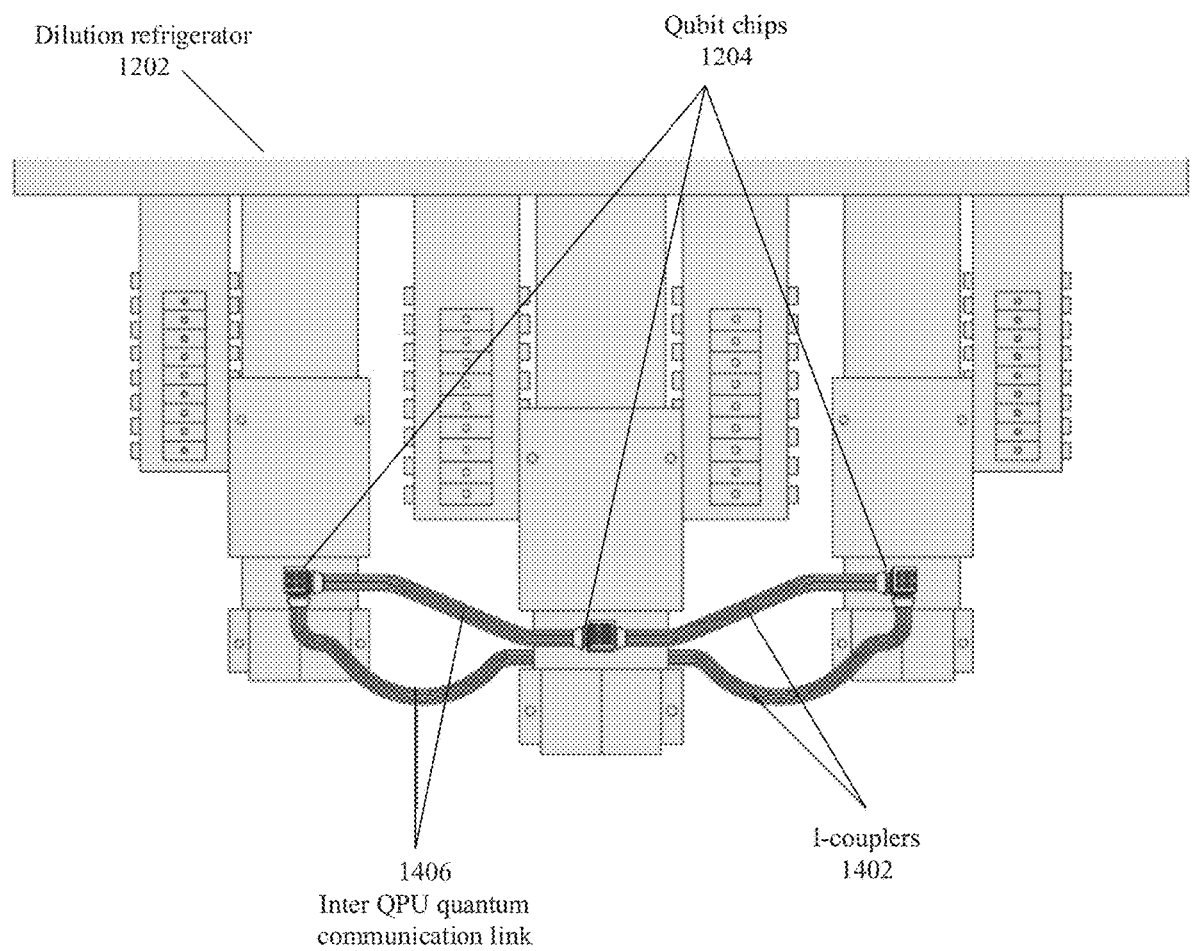
FIG. 14C further illustrates quantum parallelization of QPUs in accordance with one or more embodiments described herein.

FIG. 14C further illustrates quantum parallelization of QPUs in accordance with one or more embodiments described herein. FIG. 14C illustrates quantum parallelization of qubit chips 1204 in the context of dilution refrigerator 1202 illustrated in FIG. 12. At 1406, l-couplers 1402 can facilitate inter QPU quantum communications links between multiple QPUs on separate magnetic shielding cans on one dilution refrigeration stack.

Figure 15:
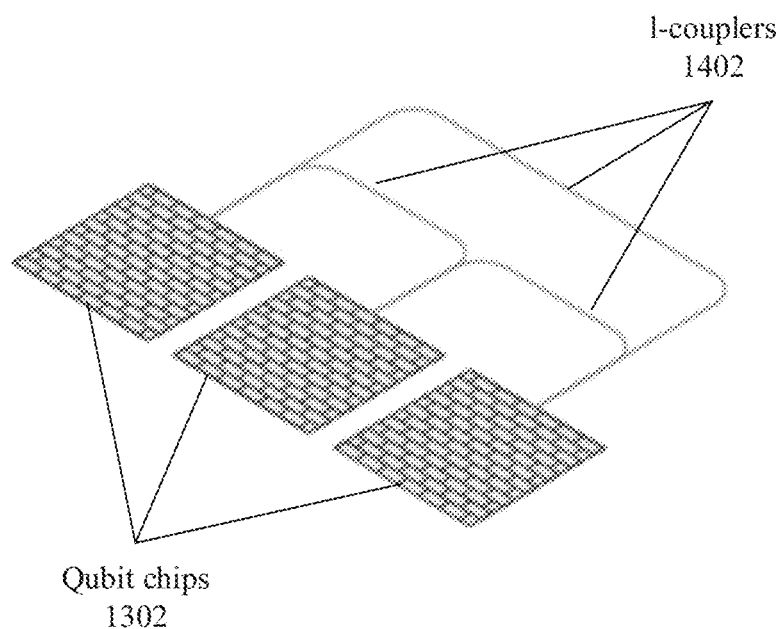
FIG. 15 further illustrates quantum parallelization of QPUs in accordance with one or more embodiments described herein.

FIG. 15 further illustrates quantum parallelization of QPUs in accordance with one or more embodiments described herein. Repetitive description of like elements and/or processes employed in respective embodiments is omitted for sake of brevity.

As discussed in one or more embodiments herein, qubit chips 1302 can be connected in a flexible manner via long range cables (e.g., l-couplers 1402) wherein the long-range cables can permit quantum operations by means of RIP, CR, Fast Flux, adiabatic state transfer, dark state transfer, etc. in much less time than the coherence time of the qubits.

Figure 16:
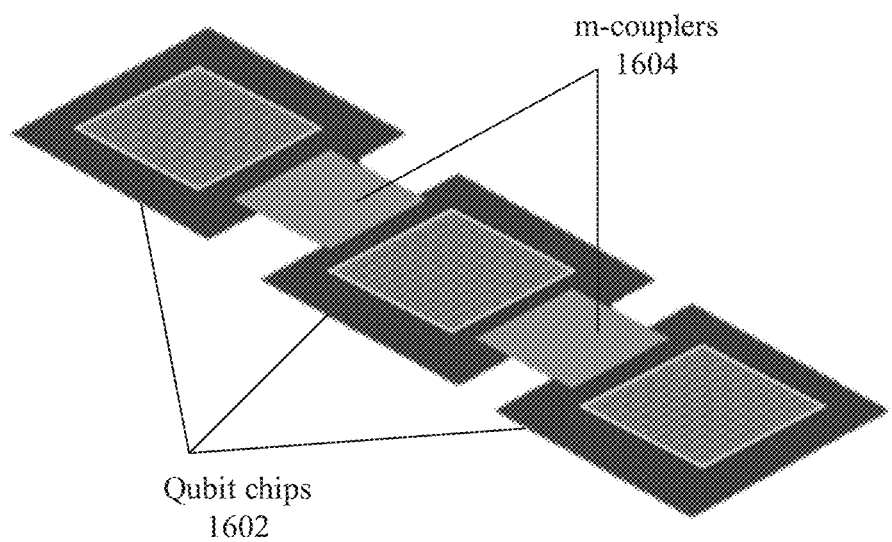
FIG. 16 illustrates an m-level modularity in accordance with one or more embodiments described herein.

FIG. 16 illustrates an m-level modularity in accordance with one or more embodiments described herein. In an m-level modularity, multiple qubit chips 1602 can be joined together by m-couplers 1604 that are short range links, less than 2 wavelengths long at the qubit frequency, and quantum gates (RIP, CR, fast flux, adiabatic, etc.) can be performed across those links.

Similar to the l-level modularity and the p-level modularity discussed in one or more embodiments, the gates in an m-level modularity can be substantially as fast as gates on the chip, permitting an extension of the fabric of one qubit chip onto another. The connections can extend the lattice on the qubit chip or extend only part of the lattice on the qubit chip. Each qubit chip can be mechanically separable and rematable, and each qubit chip can have its own classical control wiring. This can be further illustrated by the following sequence of FIGS. 17 through 19.

Figure 17:
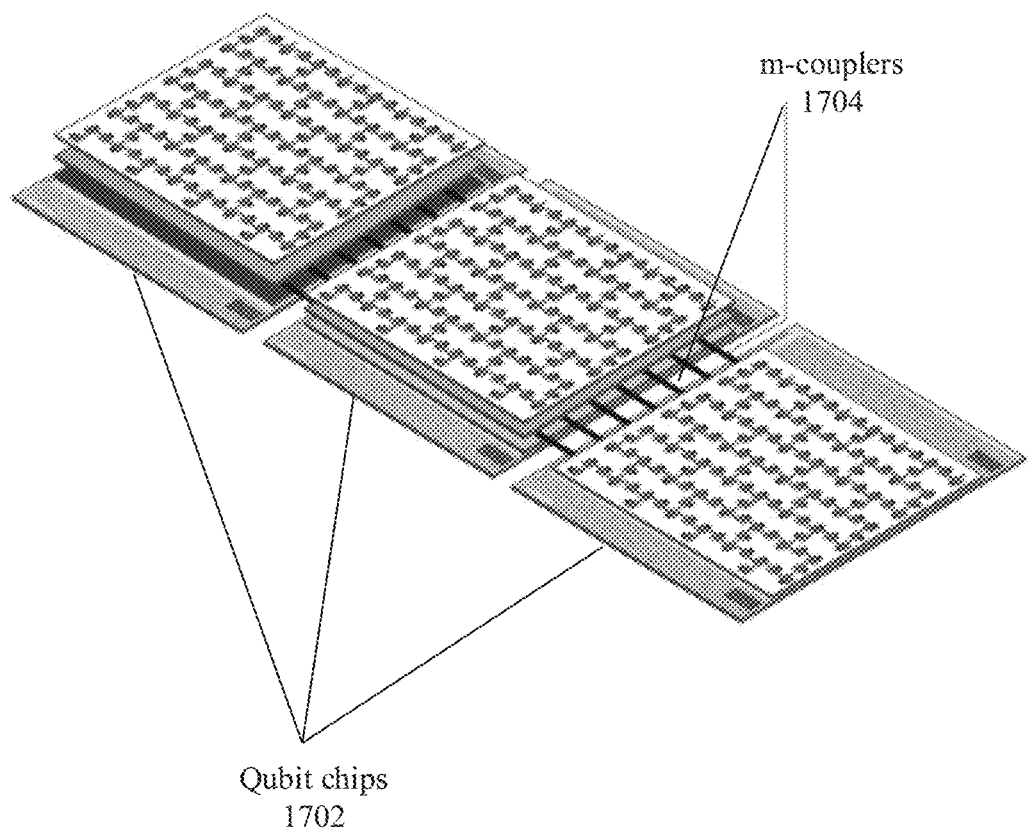
FIG. 17 illustrates coupling of multichip QPUs in an m-level modularity, in accordance with one or more embodiments described herein.

FIG. 17 illustrates coupling of multichip QPUs in an m-level modularity, in accordance with one or more embodiments described herein. Repetitive description of like elements and/or processes employed in respective embodiments is omitted for sake of brevity.

FIG. 17 illustrates m-couplers 1704, wherein m-type couplers 1704 are chip-to-chip couplers that can facilitate multi-chip quantum processors that can facilitate quantum communication between qubit chips 1702. M-type couplers (e.g., m-couplers 1704) are short-range and the chip-to-chip connections can be a capacitive or other low-loss connection.

Figure 18A:
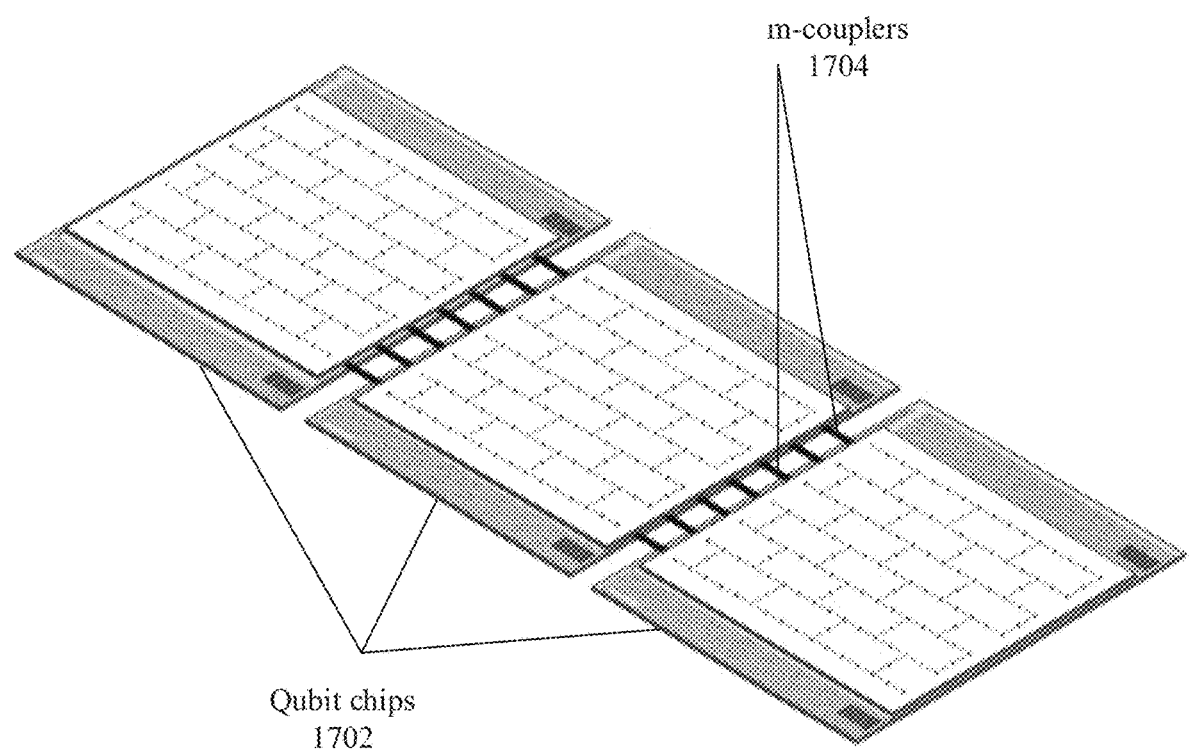
FIG. 18A further illustrates coupling of multichip QPUs in an m-level modularity, in accordance with one or more embodiments described herein.
Figure 18B:
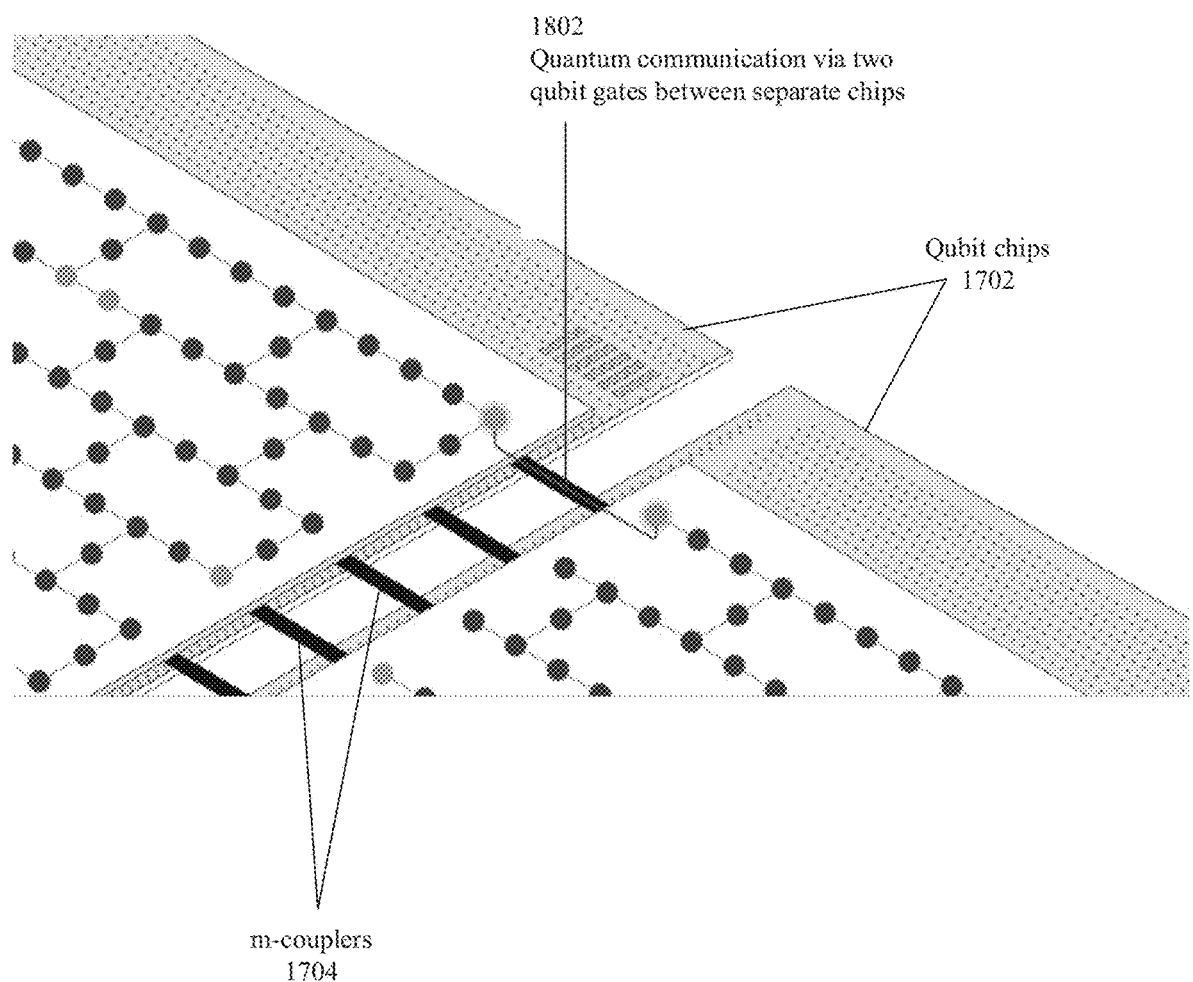
FIG. 18B further illustrates coupling of multichip QPUs in an m-level modularity, in accordance with one or more embodiments described herein.

FIG. 18A and FIG. 18B further illustrate coupling of multichip QPUs in an m-level modularity, in accordance with one or more embodiments described herein. Repetitive description of like elements and/or processes employed in respective embodiments is omitted for sake of brevity.

FIG. 18B further illustrates, at 1802, quantum communication via two qubit gates between separate chips. By employing individual qubit gates between qubits on separate qubit chips such as qubit chips 1702, quantum communication between the qubit chips can be enabled via m-couplers 1704. The qubit gates can be high fidelity and they can be run at nearly the same speed and a similar mechanism as the on-chip gates.

Figure 19:
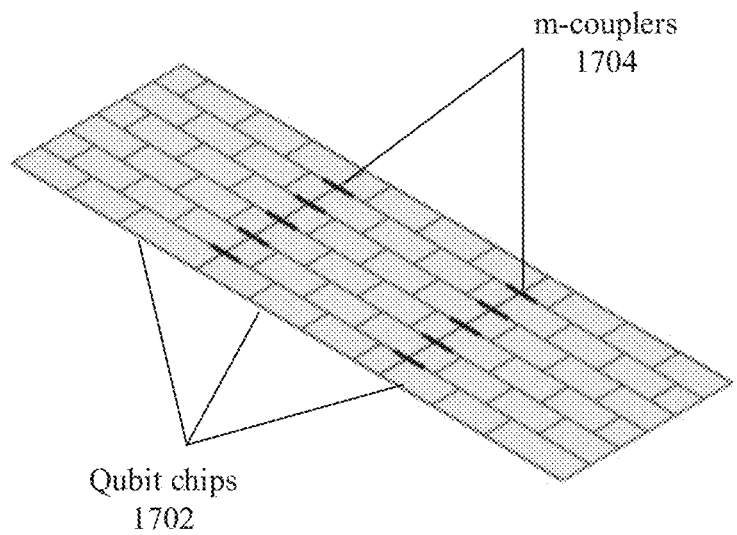
FIG. 19 further illustrates coupling of multichip QPUs in an m-level modularity, in accordance with one or more embodiments described herein.

FIG. 19 further illustrates coupling of multichip QPUs in an m-level modularity, in accordance with one or more embodiments described herein. Repetitive description of like elements and/or processes employed in respective embodiments is omitted for sake of brevity.

While FIG. 19 illustrates three qubit chips that can be coupled via m-couplers 1704 (e.g., m-couplers 1704), it is to be appreciated that more than three qubit chips can be connected via m-type couplers.

Figure 20A:
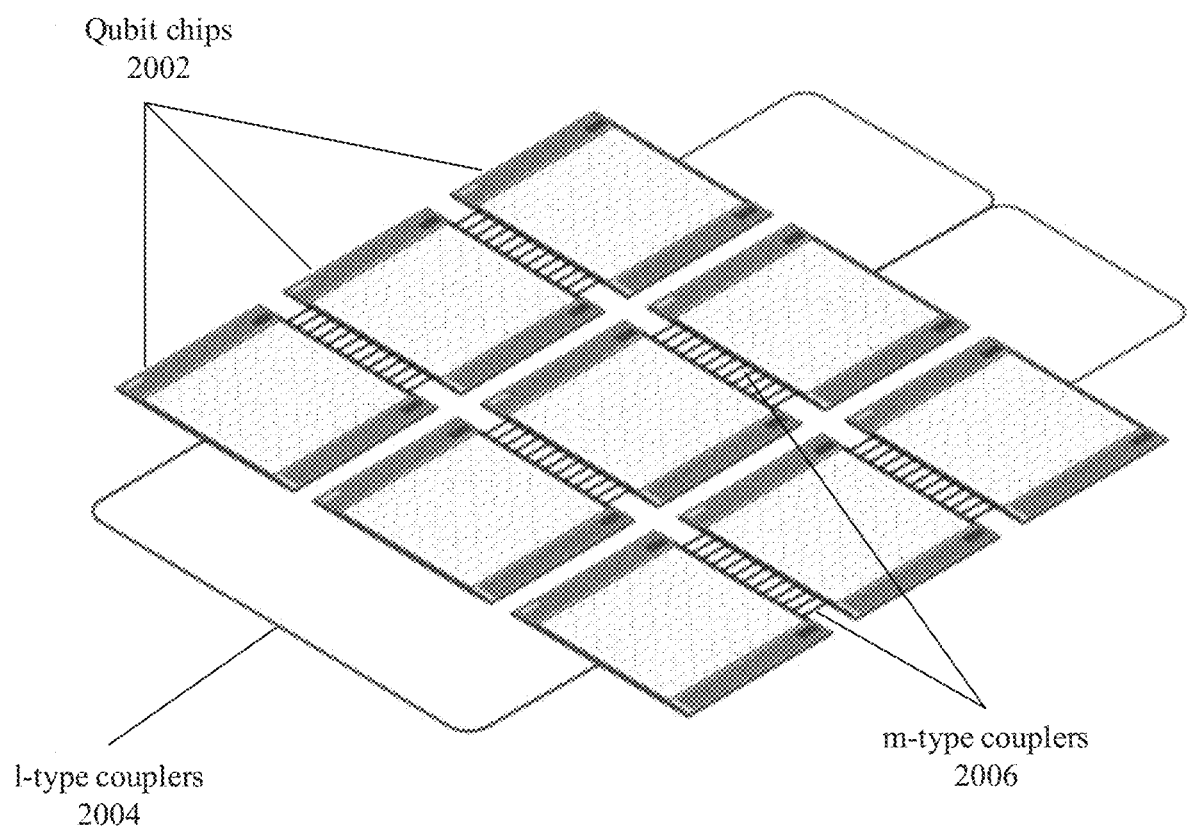
FIG. 20A illustrates quantum parallelization of multichip QPUs via an m+l-level modularity in accordance with one or more embodiments described herein.
Figure 20B:
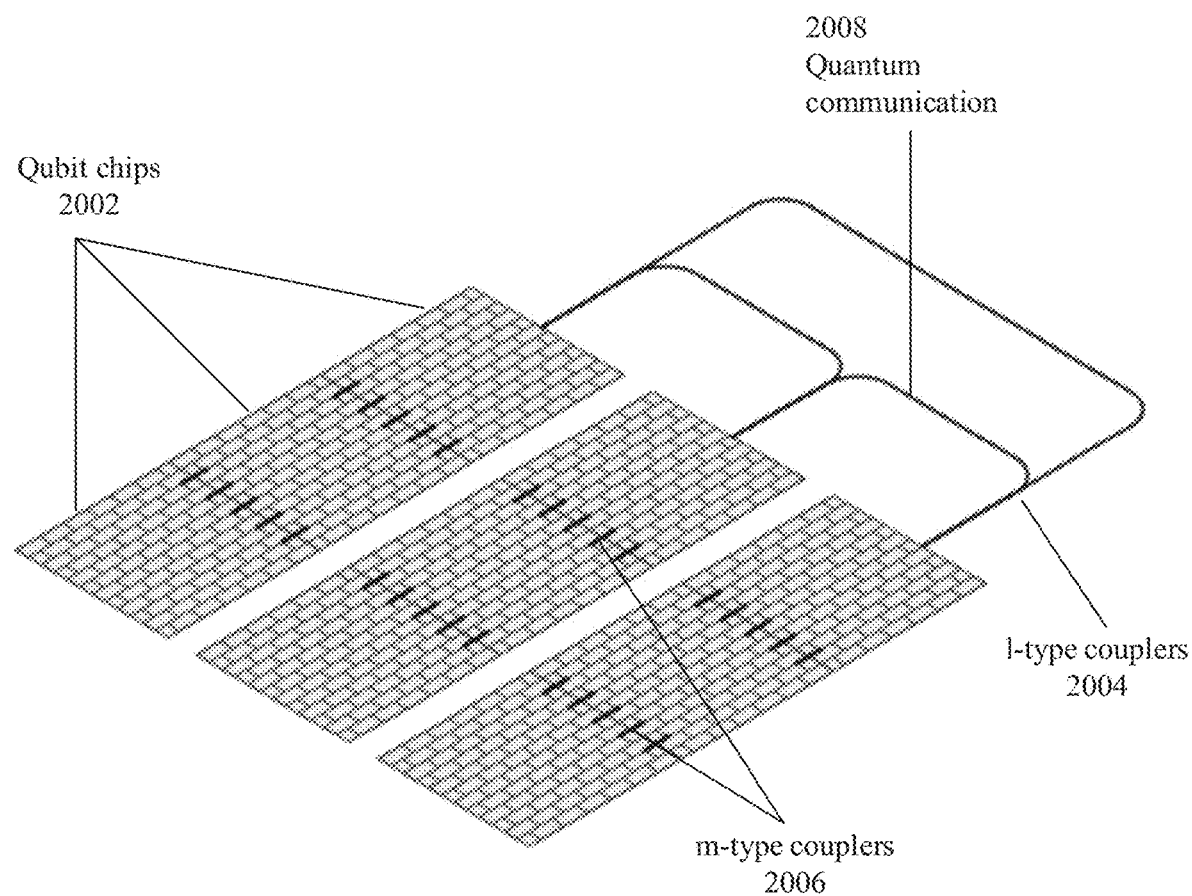
FIG. 20B further illustrates quantum parallelization of multichip QPUs via an m+l-level modularity in accordance with one or more embodiments described herein.

FIG. 20A and FIG. 20B illustrate quantum parallelization of multichip QPUs via an m+l-level modularity in accordance with one or more embodiments described herein. Repetitive description of like elements and/or processes employed in respective embodiments is omitted for sake of brevity.

In accordance with one or more embodiments discussed herein, QPUs with an m+l-level modularity such as used for coupling qubit chips 2002 can comprise both l-level and m-level modularities. In an m+l-level modularity, devices joined by an m-level modularity, such as m-type couplers 2006, can share refrigeration and control infrastructure, while those joined by an l-level modularity, l-type couplers 2004, can be on independent refrigeration and control infrastructure. Additionally, an m-level modularity can be used to make uniform patches of qubits for error correcting codes, and an l-level modularity can be used to create a high-rate code out of the encoded qubits, wherein l-type couplers 2004 can permit non-local connections between qubit chips coupled by m-type couplers 2006, thereby reducing the average qubit-to-qubit distance. M-type couplers 2006 and l-type couplers 2004 can enable orthogonal directions of lattice connectivity in accordance with FIG. 20A. At 2008 in FIG. 20B, l-type couplers 2004 facilitate quantum communication between qubit chips 2002.

In accordance with one or more embodiments discussed herein, QPUs with an l+p-level modularity used for coupling qubit chips can comprise both l-level and p-level modularities. An l+p-level modularity can be facilitated by a protocol where an entangled state can be prepared between two qubits or logical qubits across an l-link (via l-couplers), and quantum teleportation can be performed between qubit chips using a p-link (via p-couplers) to perform the teleportation. In the protocol, lattice surgery can be performed between two chips, using the p-link (provided by p-type couplers) to share stabilizer measurements. Where the latency of the p-link can be much less than the coherence time of the qubits but substantially the same as the speed of the l-coupler, it can allow synchronized classical and quantum information.

In accordance with one or more embodiments described herein, QPUs with an m+p-level modularity can comprise both m-level and p-level modularities and can behave the same as an l+p-level modularity.

Figure 21:
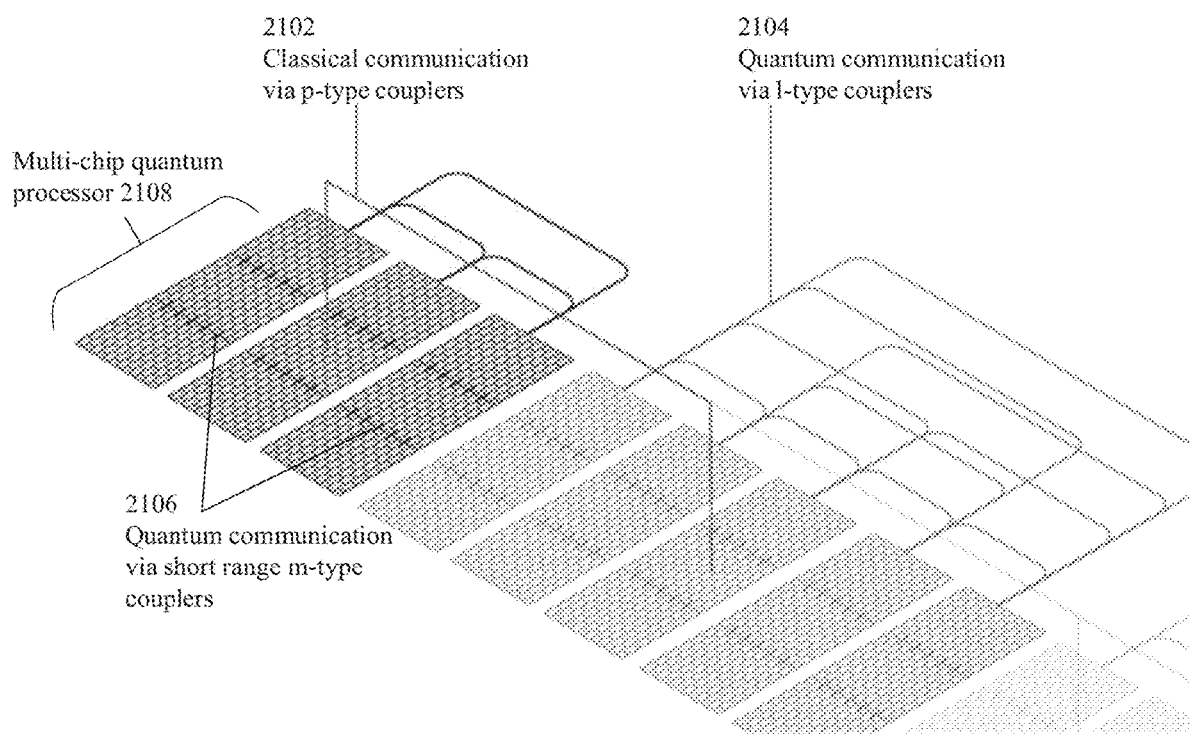
FIG. 21 further illustrates QPUs connected via an m+l+p-level modularity in accordance with one or more embodiments herein.

FIG. 21 illustrates QPUs connected via an m+l+p-level modularity in accordance with one or more embodiments herein. Repetitive description of like elements and/or processes employed in respective embodiments is omitted for sake of brevity.

An m+l+p-level modularity can behave the same as an m+l-level modularity combined with an l+p-level modularity. FIG. 21 illustrates, at 2102, classical communication via p-type couplers, quantum communication via l-type couplers at 2104, and quantum communication via short-range m-type couplers at 2106. FIG. 21 illustrates a multi-chip quantum processor 2108 wherein multiple individual QPUs can be connected via short-range chip-to-chip couplers (e.g. m-level modularity), and wherein individual multi-chip quantum processors can be connected via p-level (at 2102) and l-level modularities (at 2104). The three levels of modularity can address various limitations observed with using individual levels of modularities, as discussed in one or more embodiments herein. The three levels of modularities can facilitate building a quantum system that can coexist at different length scales, such as illustrated by FIG. 21.

Figure 22:
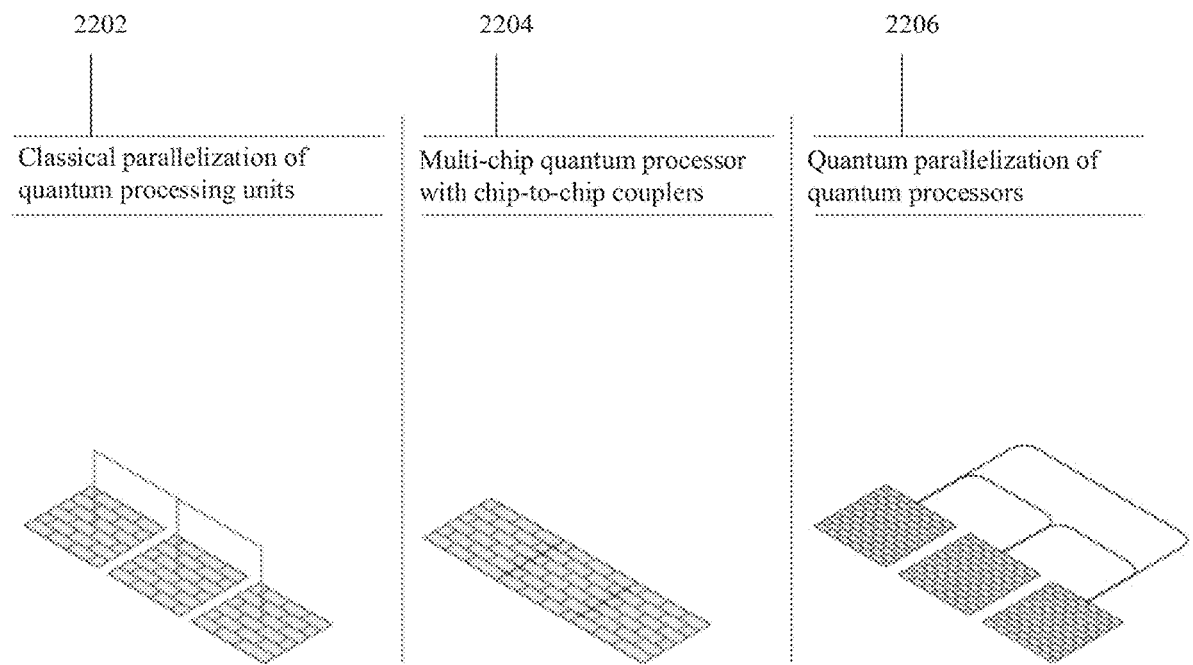
FIG. 22 illustrates a summary of classical parallelization of quantum processing units, multi-chip quantum processors with chip-to-chip couplers, and quantum parallelization of quantum processors in accordance with one or more embodiments described herein.

FIG. 22 illustrates a summary of classical parallelization of quantum processors, multi-chip quantum processors with chip-to chip couplers, and quantum parallelization of quantum processing units in accordance with one or more embodiments described herein. FIG. 22 illustrates classical parallelization of quantum processors at 2202, multi-chip quantum processors with chip-to-chip couplers at 2204, and quantum parallelization of quantum processors at 2206.

FIG. 23 illustrates a flow diagram of an example, non-limiting method that facilitates modular quantum systems with discreet levels of connectivity. Repetitive description of like elements and/or processes employed in respective embodiments is omitted for sake of brevity. Method 2300 can comprise, at 2302, coupling a plurality of at least qubits, buses, and readout structures using a plurality of couplers, wherein the plurality of couplers comprises at least two couplers selected from a group consisting of: classical couplers, short-range couplers, and long-range couplers, and wherein the plurality of at least qubits, buses and readout structures are comprised by one or more modules.

Figure 24:
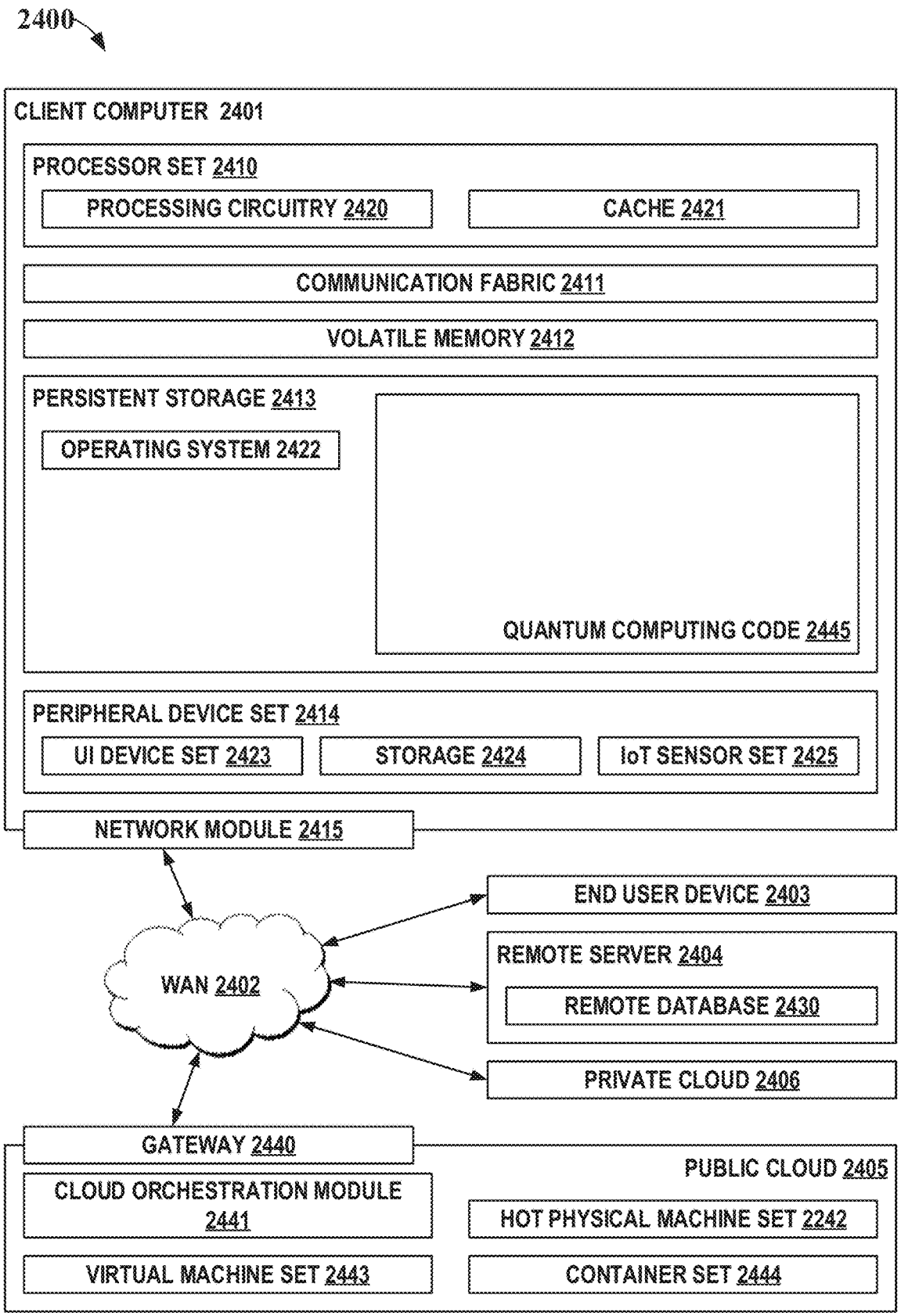
FIG. 24 illustrates a block diagram of an example, non-limiting, operating environment in which one or more embodiments described herein can be facilitated.

FIG. 24 illustrates a block diagram of an example, non-limiting, operating environment in which one or more embodiments described herein can be facilitated.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 2400 contains an example of an environment for the execution of at least some of the computer code involved in performing the inventive methods, such as quantum computing code 2445. In addition to block 2445, computing environment 2400 includes, for example, computer 2401, wide area network (WAN) 2402, end user device (EUD) 2403, remote server 2404, public cloud 2405, and private cloud 2406. In this embodiment, computer 2401 includes processor set 2410 (including processing circuitry 2420 and cache 2421), communication fabric 2411, volatile memory 2412, persistent storage 2413 (including operating system 2422 and block 2445, as identified above), peripheral device set 2414 (including user interface (UI), device set 2423, storage 2424, and Internet of Things (IoT) sensor set 2425), and network module 2415. Remote server 2404 includes remote database 2430. Public cloud 2405 includes gateway 2540, cloud orchestration module 2441, host physical machine set 2442, virtual machine set 2443, and container set 2444.

COMPUTER 2401 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 2430. As is well understood in the art of computer technology, and depending upon the technology, performance of a computer-implemented method may be distributed among multiple computers and/or between multiple locations. On the other hand, in this presentation of computing environment 2400, detailed discussion is focused on a single computer, specifically computer 2401, to keep the presentation as simple as possible. Computer 2401 may be located in a cloud, even though it is not shown in a cloud in FIG. 24. On the other hand, computer 2401 is not required to be in a cloud except to any extent as may be affirmatively indicated.

PROCESSOR SET 2410 includes one, or more, computer processors of any type now known or to be developed in the future. Processing circuitry 2420 may be distributed over multiple packages, for example, multiple, coordinated integrated circuit chips. Processing circuitry 2420 may implement multiple processor threads and/or multiple processor cores. Cache 2421 is memory that is located in the processor chip package(s) and is typically used for data or code that should be available for rapid access by the threads or cores running on processor set 2410. Cache memories are typically organized into multiple levels depending upon relative proximity to the processing circuitry. Alternatively, some, or all, of the cache for the processor set may be located "off chip." In some computing environments, processor set 2410 may be designed for working with qubits and performing quantum computing.

Computer readable program instructions are typically loaded onto computer 2401 to cause a series of operational steps to be performed by processor set 2410 of computer 2401 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 2421 and the other storage media discussed below. The program instructions, and associated data, are accessed by processor set 2410 to control and direct performance of the inventive methods. In computing environment 2400, at least some of the instructions for performing the inventive methods may be stored in block 2445 in persistent storage 2413.

COMMUNICATION FABRIC 2411 is the signal conduction paths that allow the various components of computer 2401 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 2412 is any type of volatile memory now known or to be developed in the future. Examples include dynamic type random access memory (RAM) or static type RAM. Typically, the volatile memory is characterized by random access, but this is not required unless affirmatively indicated. In computer 2401, the volatile memory 2412 is located in a single package and is internal to computer 2401, but, alternatively or additionally, the volatile memory may be distributed over multiple packages and/or located externally with respect to computer 2401.

PERSISTENT STORAGE 2413 is any form of non-volatile storage for computers that is now known or to be developed in the future. The non-volatility of this storage means that the stored data is maintained regardless of whether power is being supplied to computer 2401 and/or directly to persistent storage 2413. Persistent storage 2413 may be a read only memory (ROM), but typically at least a portion of the persistent storage allows writing of data, deletion of data and re-writing of data. Some familiar forms of persistent storage include magnetic disks and solid state storage devices. Operating system 2422 may take several forms, such as various known proprietary operating systems or open source Portable Operating System Interface type operating systems that employ a kernel. The code included in block 2445 typically includes at least some of the computer code involved in performing the inventive methods.

PERIPHERAL DEVICE SET 2414 includes the set of peripheral devices of computer 2401. Data communication connections between the peripheral devices and the other components of computer 2401 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 2423 may include components such as a display screen, speaker, microphone, wearable devices (such as goggles and smart watches), keyboard, mouse, printer, touchpad, game controllers, and haptic devices. Storage 2424 is external storage, such as an external hard drive, or insertable storage, such as an SD card. Storage 2424 may be persistent and/or volatile. In some embodiments, storage 2424 may take the form of a quantum computing storage device for storing data in the form of qubits. In embodiments where computer 2401 is required to have a large amount of storage (for example, where computer 2401 locally stores and manages a large database) then this storage may be provided by peripheral storage devices designed for storing very large amounts of data, such as a storage area network (SAN) that is shared by multiple, geographically distributed computers. IoT sensor set 2425 is made up of sensors that can be used in Internet of Things applications. For example, one sensor may be a thermometer and another sensor may be a motion detector.

NETWORK MODULE 2415 is the collection of computer software, hardware, and firmware that allows computer 2401 to communicate with other computers through WAN 2402. Network module 2415 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 2415 are performed on the same physical hardware device. In other embodiments (for example, embodiments that utilize software-defined networking (SDN)), the control functions and the forwarding functions of network module 2415 are performed on physically separate devices, such that the control functions manage several different network hardware devices. Computer readable program instructions for performing the inventive methods can typically be downloaded to computer 2401 from an external computer or external storage device through a network adapter card or network interface included in network module 2415.

WAN 2402 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 2403 is any computer system that is used and controlled by an end user (for example, a customer of an enterprise that operates computer 2401), and may take any of the forms discussed above in connection with computer 2401. EUD 2403 typically receives helpful and useful data from the operations of computer 2401. For example, in a hypothetical case where computer 2401 is designed to provide a recommendation to an end user, this recommendation would typically be communicated from network module 2415 of computer 2401 through WAN 2402 to EUD 2403. In this way, EUD 2403 can display, or otherwise present, the recommendation to an end user. In some embodiments, EUD 2403 may be a client device, such as thin client, heavy client, mainframe computer, desktop computer and so on.

REMOTE SERVER 2404 is any computer system that serves at least some data and/or functionality to computer 2401. Remote server 2404 may be controlled and used by the same entity that operates computer 2401. Remote server 104 represents the machine(s) that collect and store helpful and useful data for use by other computers, such as computer 2401. For example, in a hypothetical case where computer 2401 is designed and programmed to provide a recommendation based on historical data, then this historical data may be provided to computer 2401 from remote database 2430 of remote server 2404.

PUBLIC CLOUD 2405 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 2405 is performed by the computer hardware and/or software of cloud orchestration module 2441. The computing resources provided by public cloud 2405 are typically implemented by virtual computing environments that run on various computers making up the computers of host physical machine set 2442, which is the universe of physical computers in and/or available to public cloud 2405. The virtual computing environments (VCEs) typically take the form of virtual machines from virtual machine set 2443 and/or containers from container set 2444. It is understood that these VCEs may be stored as images and may be transferred among and between the various physical machine hosts, either as images or after instantiation of the VCE. Cloud orchestration module 2441 manages the transfer and storage of images, deploys new instantiations of VCEs and manages active instantiations of VCE deployments. Gateway 2440 is the collection of computer software, hardware, and firmware that allows public cloud 2405 to communicate through WAN 2402.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 2406 is similar to public cloud 2405, except that the computing resources are only available for use by a single enterprise. While private cloud 2406 is depicted as being in communication with WAN 2402, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 2405 and private cloud 2406 are both part of a larger hybrid cloud.

What is claimed is:

1. A quantum computing device comprising:
   one or more modules comprising at least qubits, buses, and readout structures;
   a plurality of couplers, wherein the plurality of couplers comprises at least two couplers selected from a group consisting of: classical couplers, short-range couplers, and long-range couplers, that are adapted for coupling a plurality of the at least qubits, buses, and readout structures, wherein the classical couplers refer to a classical computation unit employable to couple the plurality of the at least qubits, buses, and readout structures, and wherein respective short-range couplers and respective long-range couplers represent respective physical connections employable to couple the plurality of the at least qubits, buses, and readout structures; and
   a connection from the one or more modules to at least two classical controllers external to a cryogenic environment comprising the one or more modules.

2. The quantum computing device of claim 1, wherein a bus external to the cryogenic environment and running between the at least two classical controllers is adapted to carry classical information between the at least two classical controllers.

3. The quantum computing device of claim 2, wherein the bus is adapted to carry the classical information in a time less than a coherence time (T1) of qubits.

4. The quantum computing device of claim 1, wherein connections between at least two consecutive modules of the one or more modules are less than a defined length to create a longitudinal or transverse coupling between qubits on edges of modules.

5. The quantum computing device of claim 1, wherein qubits comprised within the at least qubits, buses, and readout structures extend a qubit lattice between at least two modules of the one or more modules.

6. The quantum computing device of claim 1, wherein the short-range couplers are characterized as being shorter than a defined length, and wherein the short-range couplers are characterized as having a defined number of channels between at least two connected modules of the one or more modules.

7. The quantum computing device of claim 1, wherein the classical couplers are adapted to provide classical parallelization between individual modules of the one or more modules by connecting to the individual modules.

8. The quantum computing device of claim 1, wherein the long-range couplers are characterized as being longer than a defined length, and wherein individual modules of the one or more modules are respectively disposed on separate and distinct substrates.

9. The quantum computing device of claim 1, wherein a combination of the classical couplers and the short-range couplers and a combination of the classical couplers and the long-range couplers allow synchronization of classical and quantum information between at least two modules of the one or more modules.

10. A method, comprising:
coupling a plurality of at least qubits, buses, and readout structures using a plurality of couplers, wherein the plurality of couplers comprises at least two couplers selected from a group consisting of: classical couplers, short-range couplers, and long-range couplers, wherein the plurality of at least qubits, buses and readout structures are comprised by one or more modules, wherein the classical couplers refer to a classical computation unit employable to couple the plurality of at least qubits, buses, and readout structures, and wherein respective short-range couplers and respective long-range couplers represent respective physical connections employable to couple the plurality of at least qubits, buses, and readout structures.

11. The method of claim 10, further comprising:
creating a longitudinal or transverse coupling between qubits on edges of modules using connections between at least two consecutive modules of the one or more modules, wherein the connections are less than a defined length.

12. The method of claim 11, wherein qubits comprised within the plurality of at least qubits, buses, and readout structures extend a qubit lattice between at least two modules of the one or more modules.

13. The method of claim 10, wherein the short-range couplers are characterized as being shorter than a defined length.

14. The method of claim 10, wherein the short-range couplers are characterized as having a defined number of channels between at least two connected modules of the one or more modules.

15. The method of claim 10, wherein the classical couplers are adapted to provide classical parallelization between individual modules of the one or more modules by connecting to the individual modules.

16. The method of claim 10, wherein the long-range couplers are characterized as being longer than a defined length.

17. The method of claim 10, wherein individual modules of the one or more modules are respectively disposed on separate and distinct substrates.

18. A quantum computing device, comprising:
one or more modules comprising at least qubits, buses, and readout structures;
a plurality of couplers, wherein the plurality of couplers comprises at least two couplers selected from a group consisting of: classical couplers, short-range couplers, and long-range couplers, that are adapted for coupling a plurality of the at least qubits, buses, and readout structures, wherein the classical couplers refer to a classical computation unit employable to couple the plurality of the at least qubits, buses, and readout structures, and wherein respective short-range couplers and respective long-range couplers represent respective physical connections employable to couple the plurality of the at least qubits, buses, and readout structures; and
a connection from the one or more modules to a classical controller external to a cryogenic environment comprising the one or more modules.

19. The quantum computing device of claim 18, wherein the classical controller measures a state of a qubit on a first module of the one or more modules.

20. The quantum computing device of claim 19, wherein based on a measurement of the state of the qubit, the classical controller conditionally performs one or more operations on a second module of the one or more modules, via a bus external to the cryogenic environment.

* * * * *